US011032593B2

(12) United States Patent
Guo

(10) Patent No.: US 11,032,593 B2
(45) Date of Patent: Jun. 8, 2021

(54) ACCOUNT LOGIN METHOD AND SYSTEM, VIDEO TERMINAL, MOBILE TERMINAL, AND STORAGE MEDIUM

(71) Applicant: TENCENT TECHNOLOGY (SHENZHEN) COMPANY LIMITED, Shenzhen (CN)

(72) Inventor: Kaiyi Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/822,960

(22) Filed: Mar. 18, 2020

(65) Prior Publication Data
US 2020/0221150 A1 Jul. 9, 2020

Related U.S. Application Data

(63) Continuation of application No. PCT/CN2018/107348, filed on Sep. 25, 2018.

(30) Foreign Application Priority Data

Sep. 27, 2017 (CN) .......................... 201710891484.7

(51) Int. Cl.
*H04N 21/258* (2011.01)
*H04L 29/06* (2006.01)
(Continued)

(52) U.S. Cl.
CPC ..... *H04N 21/25875* (2013.01); *H04L 63/083* (2013.01); *H04L 63/0807* (2013.01);
(Continued)

(58) Field of Classification Search
None
See application file for complete search history.

(56) References Cited

U.S. PATENT DOCUMENTS

| 8,931,060 | B2* | 1/2015 | Bidare | H04L 9/3247 |
| | | | | 726/4 |
| 2005/0177522 | A1* | 8/2005 | Williams | G07F 7/1025 |
| | | | | 705/72 |
| 2016/0012823 | A1* | 1/2016 | Roos | G10L 17/24 |
| | | | | 704/239 |

FOREIGN PATENT DOCUMENTS

| CN | 103023917 A | 4/2013 |
| CN | 103596021 A | 2/2014 |

(Continued)

OTHER PUBLICATIONS

The World Intellectual Property Organization (WIPO) International Search Report for PCT/CN2018/107348 dated Jan. 4, 2019 5 Pages (including translation).
(Continued)

*Primary Examiner* — Omar S Parra
(74) *Attorney, Agent, or Firm* — Anova Law Group, PLLC

(57) ABSTRACT

An account login method includes obtaining, by a video terminal, a first matching code from a service server based on a video terminal identifier, and outputting the first matching code; obtaining, by a mobile terminal, an inputted second matching code from a login page, and obtaining the video terminal identifier from the service server based on the second matching code; and transmitting, by the mobile terminal, a login key request carrying the video terminal identifier to the service server, obtaining a first video login key that is returned by the service server and corresponds to the video terminal identifier, and outputting the first video login key. The method also includes obtaining, by the video terminal, an inputted direction control instruction, recognizing a second video login key indicated by the direction control instruction, and performing login on the video terminal according to the second video login key.

14 Claims, 13 Drawing Sheets

(51) Int. Cl.
  *H04N 21/41*    (2011.01)
  *H04N 21/44*    (2011.01)
  *H04N 21/475*   (2011.01)
  *H04N 21/6334*  (2011.01)
  *H04N 21/8352*  (2011.01)

(52) U.S. Cl.
  CPC ..... *H04L 63/0815* (2013.01); *H04N 21/4126* (2013.01); *H04N 21/44* (2013.01); *H04N 21/4753* (2013.01); *H04N 21/6334* (2013.01); *H04N 21/8352* (2013.01)

(56) References Cited

FOREIGN PATENT DOCUMENTS

| | | |
|---|---|---|
| CN | 103634109 A | 3/2014 |
| CN | 104320703 A | 1/2015 |
| CN | 105812874 A | 7/2016 |
| JP | 2014038612 A | 2/2014 |
| KR | 20140049799 A | 4/2014 |

OTHER PUBLICATIONS

The State Intellectual Property Office of the People's Republic of China (SIPO) Office Action 1 for 201710891484.7 dated Sep. 11, 2020 9 Pages (including translation).

\* cited by examiner

Please input the six digits on the video terminal

Please input the six digits on the video terminal

615842

ACCOUNT LOGIN METHOD AND SYSTEM, VIDEO TERMINAL, MOBILE TERMINAL, AND STORAGE MEDIUM

RELATED APPLICATIONS

This application is a continuation application of PCT Patent Application No. PCT/CN2018/107348, filed on Sep. 25, 2018, which claims priority to Chinese Patent Application No. 201710891484.7, filed with the Chinese Patent Office on Wednesday, Sep. 27, 2017 and entitled "ACCOUNT LOGIN METHOD AND SYSTEM, TERMINAL, AND STORAGE MEDIUM", content of all of which is incorporated herein by reference in its entirety.

FIELD OF THE TECHNOLOGY

This application relates to the field of computer technologies and, in particular, to an account login method and system, a video terminal, a mobile terminal, and a storage medium.

BACKGROUND OF THE DISCLOSURE

With the rapid development of Internet technologies, online video terminals such as online televisions already become the mainstream in the current development of television markets. With the access to the Internet, a variety of applications may be installed on television terminals to implement functions such as online video on demand of video resources. The fundamental operation before the use of online television is to complete login on a television terminal. Currently, as shown in FIG. 1, a television remote control may be used to control a virtual keyboard in a television interface to input an account and a password to log in. Alternatively, as shown in FIG. 2, a mobile phone is used to scan a 2D code in a television interface to complete login on a television terminal based on a third-party application (for example, a mobile number or various types of social networking applications). However, it is a complex and error-prone process to use a remote control to control a virtual keyboard to input an account and a password, resulting in affected login efficiency on a television terminal. In the other process of scanning a 2D code to complete login, in a case that a 2D code cannot be displayed or cannot be completely displayed, repeated scans are required to obtain a complete 2D code to complete login on a television terminal, the login efficiency on the television terminal is also affected.

The disclosed methods and systems are directed to solve one or more problems set forth above and other problems.

SUMMARY

Various embodiments of the present disclosure provide an account login method and system, a video terminal, a mobile terminal, and a storage medium.

An embodiment of the present disclosure provides an account login method. The method includes obtaining, by a video terminal, a first matching code from a service server based on a video terminal identifier, and outputting the first matching code; obtaining, by a mobile terminal, an inputted second matching code from a login page, and obtaining the video terminal identifier from the service server based on the second matching code; and transmitting, by the mobile terminal, a login key request carrying the video terminal identifier to the service server, obtaining a first video login key that is returned by the service server and corresponds to the video terminal identifier, and outputting the first video login key. The method also include obtaining, by the video terminal, an inputted direction control instruction, recognizing a second video login key indicated by the direction control instruction, and performing login on the video terminal according to the second video login key.

Another embodiment of the present disclosure further provides an account login method for a video terminal. The method includes obtaining a first matching code from a service server based on a video terminal identifier, and outputting the first matching code to enable a mobile terminal to obtain an inputted second matching code from a login page and enable the mobile terminal to obtain the video terminal identifier from the service server based on the second matching code. There is a correspondence between the first matching code and the second matching code. The method also includes obtaining an inputted direction control instruction, recognizing a second video login key indicated by the direction control instruction, and performing login on the video terminal according to the second video login key. The direction control instruction is an instruction inputted according to a first video login key. There is a correspondence between the first video login key and the second video login key, and the first video login key is an obtained login key that is returned by the service server and corresponds to the video terminal identifier after the mobile terminal transmits a login key request carrying the video terminal identifier to the service server.

An embodiment of the present disclosure further provides a video terminal. The video terminal includes a memory storing computer-readable instructions; and a processor coupled to the memory to execute the computer-readable instructions. When executing the computer-readable instructions, the processor is configured to perform: obtaining a first matching code from a service server based on a video terminal identifier, and outputting the first matching code to enable a mobile terminal to obtain an inputted second matching code from a login page and enable the mobile terminal to obtain the video terminal identifier from the service server based on the second matching code, there being a correspondence between the first matching code and the second matching code; and obtaining an inputted direction control instruction, recognizing a second video login key indicated by the direction control instruction, and performing login on the video terminal according to the second video login key, the direction control instruction being an instruction inputted according to a first video login key. There is a correspondence between the first video login key and the second video login key, and the first video login key is an obtained login key that is returned by the service server and corresponds to the video terminal identifier after the mobile terminal transmits a login key request carrying the video terminal identifier to the service server.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure or in the related art more clearly, the following briefly introduces the accompanying drawings for describing the embodiments. Apparently, the accompanying drawings in the following description show merely some embodiments of the present disclosure, and a person of ordinary skill in the art may still derive other drawings from the accompanying drawings without creative efforts.

DETAILED DESCRIPTION

Figure 1:
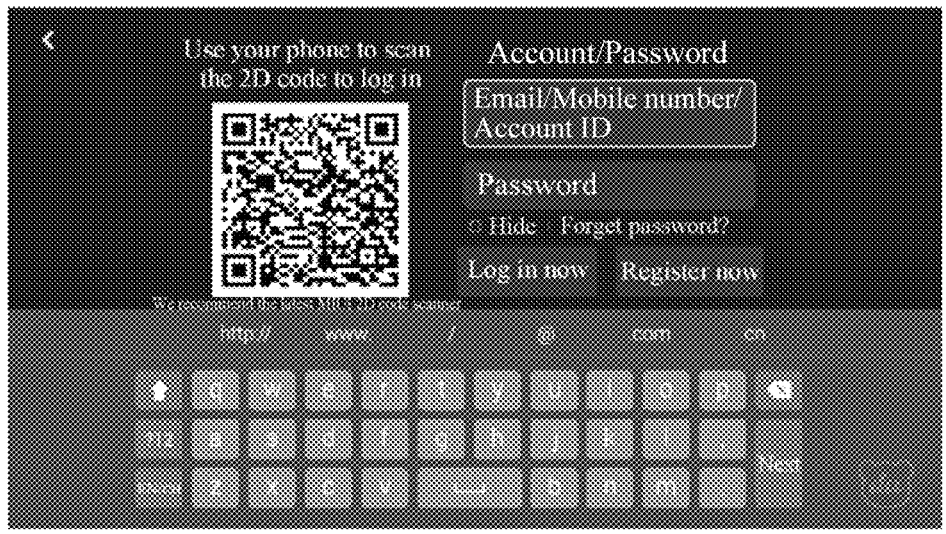
FIG. 1 is a schematic diagram of a login interface on a video terminal according to an embodiment of the present disclosure.
Figure 2:
FIG. 2 is a schematic diagram of another login interface on a video terminal according to an embodiment of the present disclosure.

The technical solutions in the embodiments of the present disclosure are described below with reference to the accompanying drawings. Apparently, the embodiments to be described are merely some rather than all of the embodiments of the present disclosure. Other embodiments obtained by persons of ordinary skill in the art based on the embodiments of the present disclosure without creative efforts shall fall within the protection scope of the present disclosure.

An account login method provided in the embodiments of the present disclosure may be applied to a scenario in which a mobile terminal obtains a login key and arrows keys on a remote control apparatus are used to input the login key to perform login on a television terminal. For example, a video terminal obtains a first matching code from a service server based on a video terminal identifier, and outputs the first matching code. The mobile terminal obtains an inputted second matching code from a login page, and obtains the video terminal identifier from the service server based on the second matching code, there being a correspondence between the first matching code and the second matching code. The mobile terminal transmits a login key request carrying the video terminal identifier to the service server, obtains a first video login key that is returned by the service server and corresponds to the video terminal identifier, and outputs the first video login key. The video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal.

The video terminal used in the embodiments of the present disclosure may be a television terminal device that accesses the Internet via a set-top box or a computer to implement services such as digital television, time-shifted television, and interactive television. The mobile terminal used in the embodiments of the present disclosure may be a terminal device such as a smartphone, a tablet computer, and a mobile Internet device (MID). An application server used in the embodiments of the present disclosure may be a computer device that provides a terminal application with a background service. The service server used in the embodiments of the present disclosure may be a computer device that has management resources and provides the video terminal with service support, for example, may be a server having a relatively high data bearing capability and processing capability. The servers used in the embodiments of the present disclosure may be integrated together or may be separately disposed, or a plurality of servers constitute a server cluster. This is not limited in the present disclosure.

The following describes an account login method according to the embodiments of the present disclosure in detail with reference to FIG. 3 to FIG. 15.

Figure 3:
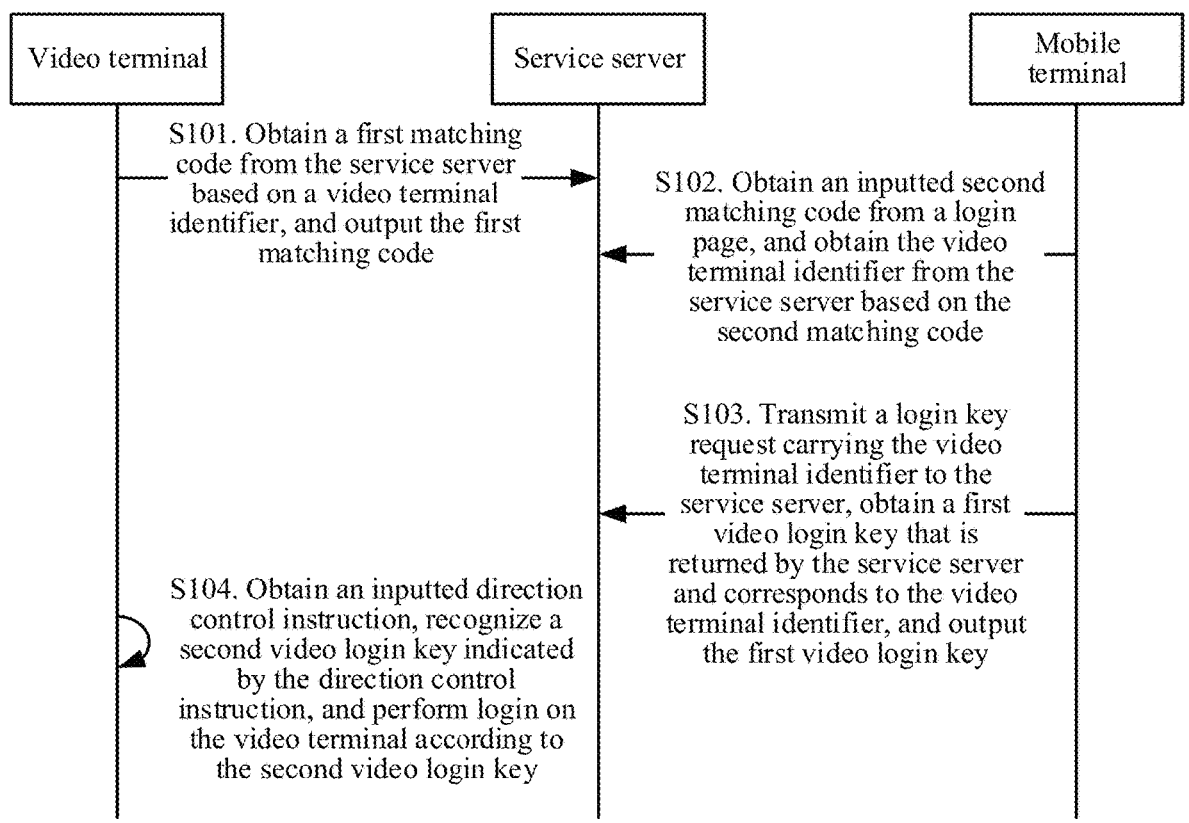
FIG. 3 is a schematic flowchart of an account login method according to an embodiment of the present disclosure.
Figure 4:
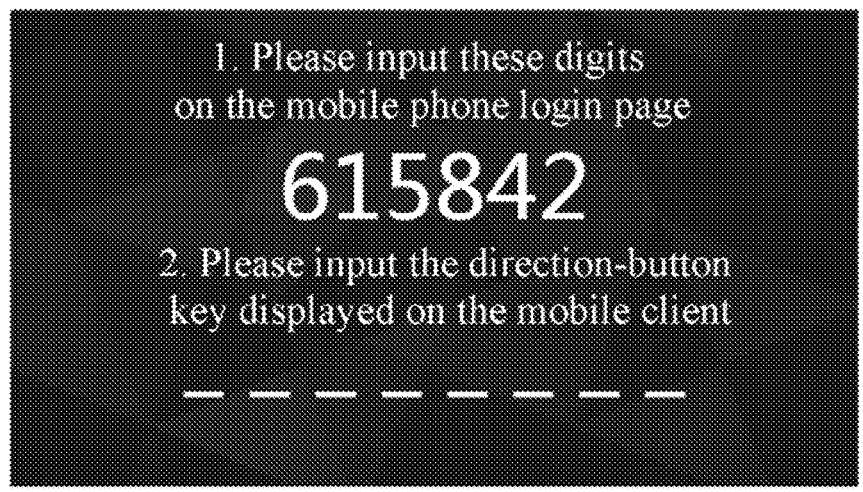
FIG. 4 is a schematic diagram of a display effect of a first matching code on a video terminal according to an embodiment of the present disclosure.

FIG. 3 is a schematic flowchart of an account login method according to an embodiment of the present disclosure. As shown in FIG. 3, the method may include the following steps S101 to S104.

S101: A video terminal obtains a first matching code from a service server based on a video terminal identifier, and outputs the first matching code.

Specifically, the video terminal may obtain the first matching code from the service server based on the video terminal identifier and output the first matching code. It is understood that the video terminal identifier may be an identification code that uniquely identifies the video terminal. For example, the video terminal identifier may be an ID of the video terminal. The first matching code may be practically an account randomly generated by the service server for login on the video terminal. For example, the first matching code may be a combination of one or more of digits, letters, special characters, and the like. It is understood that the video terminal may display the first matching code in a video login interface shown in FIG. 4 or may read out the first matching code.

In an embodiment, the video terminal may transmit a matching code obtaining request carrying the video terminal identifier to the service server. After receiving the matching code obtaining request, the service server randomly generates the first matching code according to the video terminal identifier, may store a correspondence between the video terminal identifier and the first matching code, and then returns the first matching code to the video terminal for output.

S102: A mobile terminal obtains an inputted second matching code from a login page, and obtains the video terminal identifier from the service server based on the second matching code.

Figure 5A:
FIG. 5A is a schematic diagram of a login page on a mobile terminal according to an embodiment of the present disclosure.
Figure 5A:
Figure 5A:

It is understood that the mobile terminal may display the login page correlated to the video terminal according to a login manner (for example, login via an official account or login via a website) selected by a user. The login page may be a mobile terminal login page that is displayed on the mobile terminal and is correlated to the video login interface after a login and authorization relationship is established between the mobile terminal and the video terminal, as shown in FIG. 5A.

Specifically, the mobile terminal may obtain the inputted second matching code from the login page. It is understood that there is a correspondence between the first matching code and the second matching code. For example, the second matching code may be consistent with the first matching code (for example, the first matching code is 615842, and the inputted second matching code is also 615842). The second matching code may be alternatively a matching code that is obtained after the first matching code is correspondingly processed and has a correspondence with the first matching code (for example, the first matching code is 123456, and the second matching code may be 234567 obtained by adding 1 to every digit of the first matching code). It is understood that the corresponding processing may be a processing manner agreed in advance among the video terminal, the mobile terminal, and the service server. Different processing manners may be agreed according to IDs of different video terminals. After obtaining the second matching code, the mobile terminal may display the second matching code on the login page in the manner shown in FIG. 5B.

Further, the mobile terminal may obtain the video terminal identifier from the service server based on the second matching code. It is understood that because the service server stores a correspondence between the first matching code and the video terminal identifier, in response to determining that the inputted second matching code is the first matching code or has a correspondence with the first matching code, the service server may transmit the video terminal identifier to the mobile terminal.

S103: The mobile terminal transmits a login key request carrying the video terminal identifier to the service server, obtains a first video login key that is returned by the service server and corresponds to the video terminal identifier, and outputs the first video login key.

Specifically, after obtaining the video terminal identifier, the mobile terminal may transmit the login key request carrying the video terminal identifier to the service server. After receiving the login key request, the service server may randomly generate the first video login key. It is understood that the first video login key may be equivalent to a password corresponding to an account during login on the video terminal, and may be, for example, a login key formed by direction characters such as ↑, ↓, ←, and →. It is understood that there is a unique correspondence between the video terminal identifier and the first video login key.

Figure 6:
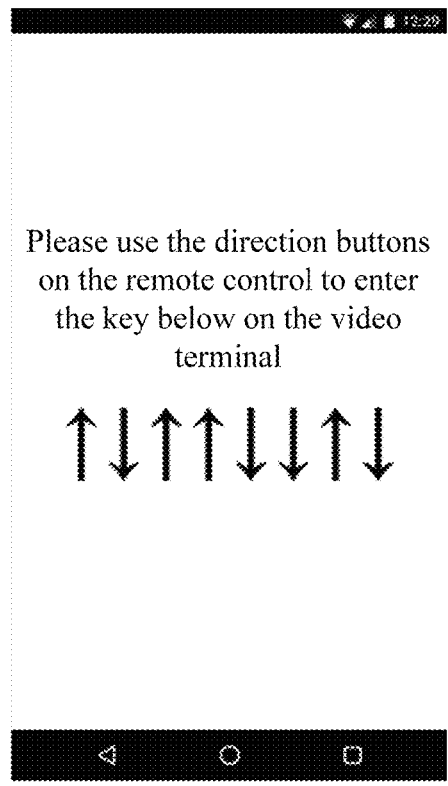
FIG. 6 is a schematic diagram of a display effect of a first video login key on a mobile terminal according to an embodiment of the present disclosure.

Further, the mobile terminal may obtain the first video login key that is returned by the service server and corresponds to the video terminal identifier, and may output the first video login key, for example, output the first login key "↑↓↑↑↓↓↑↓" shown in FIG. 6 or read out a login key formed by different direction characters and shown in FIG. 6.

S104: The video terminal obtains an inputted direction control instruction, recognizes a second video login key indicated by the direction control instruction, and performs login on the video terminal according to the second video login key.

It is understood that the first video login key outputted by the mobile terminal may be a key that needs to be inputted to perform login on the video terminal. Specifically, the video terminal may obtain the direction control instruction inputted by using direction buttons on a video remote control device, and recognize the second video login key indicated by the direction control instruction. It is understood that there is a correspondence between the first video login key and the second video login key. For example, the second video login key may be consistent with the first video login key (for example, the first video login key is "↑↓↑↑↓↓↑↓", and the inputted second video login key is also "↑↓↑↑↓↓↑↓"). The second video login key may be alternatively a video login key that is obtained after the first video login key is correspondingly processed and has a correspondence with the first video login key (for example, the first video login key is "↑↓↑↑↓↓↑↓", and the second video login key may be "↓↑↓↓↑↑↓↑" obtained by inverting the first video login key). It is understood that the corresponding processing may be a processing manner agreed in advance among the video terminal, the mobile terminal, and the service server. Different processing manners may be agreed according to IDs of different video terminals.

Figure 7:
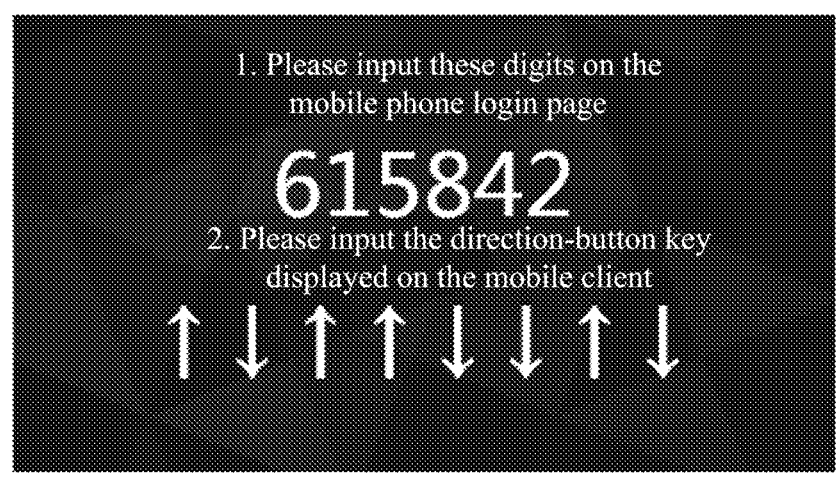
FIG. 7 is a schematic diagram of a login interface on a video terminal according to an embodiment of the present disclosure.

Further, after the video terminal recognizes the second video login key, a login interface of the video terminal may be shown in FIG. 7. The input similar to that of a login account and password has been completed, and login is completed on the video terminal.

In an embodiment, the direction control instruction is a voice direction control instruction. The video terminal may obtain the inputted voice direction control instruction, and transmit the voice direction control instruction to the service server. The service server may recognize the second video login key indicated by the voice direction control instruction and return the second video login key to the video terminal. The video terminal performs login on the video terminal according to the second video login key.

In one embodiment of the present disclosure, a video terminal obtains a first matching code from a service server based on a video terminal identifier, and outputs the first matching code. A mobile terminal obtains an inputted second matching code from a login page, and obtains the video terminal identifier from the service server based on the second matching code, there being a correspondence between the first matching code and the second matching code. Further, the mobile terminal transmits a login key request carrying the video terminal identifier to the service server, obtains a first video login key that is returned by the service server and corresponds to the video terminal identifier, and outputs the first video login key. Finally, the video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal.

Figure 8:
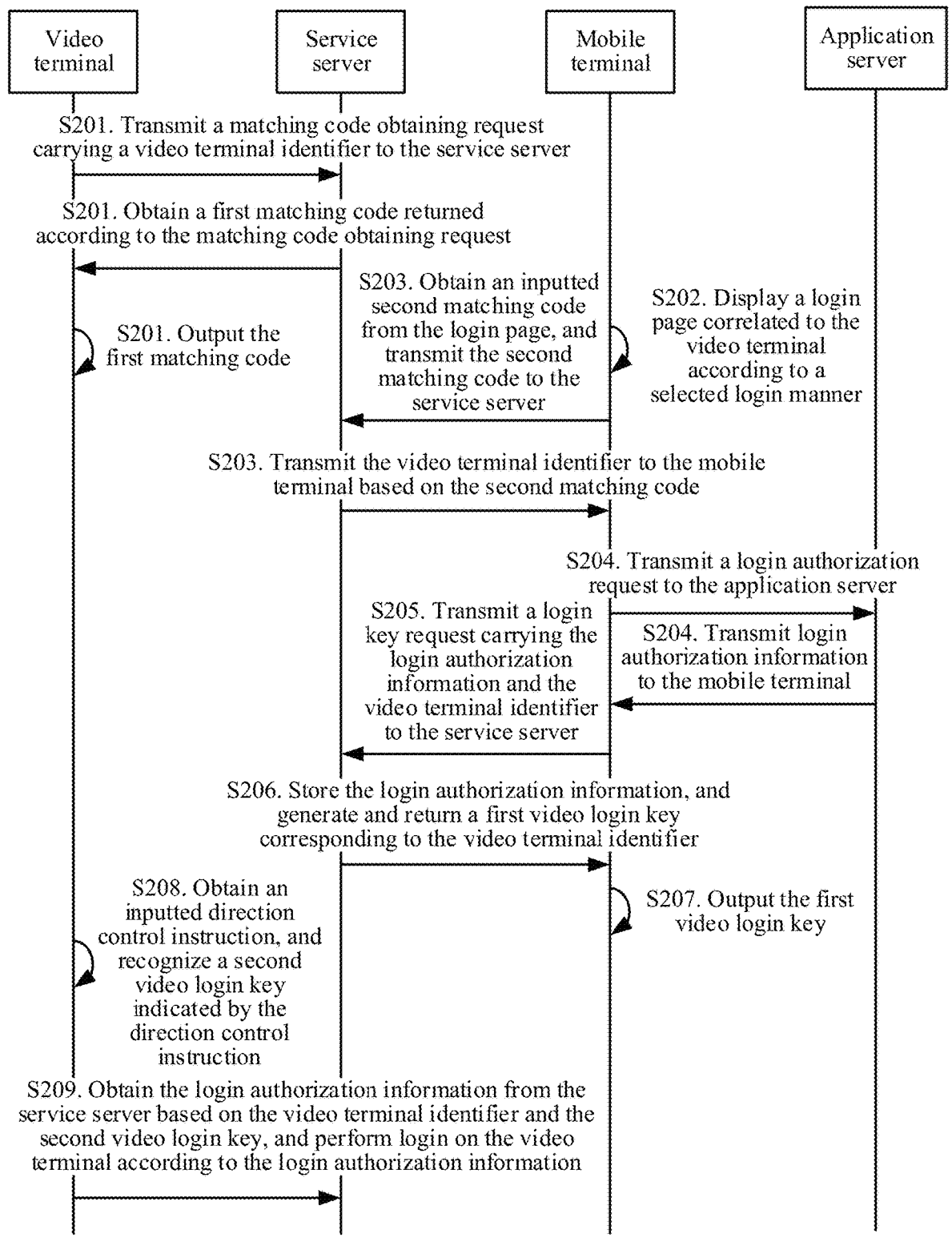
FIG. 8 is a schematic flowchart of another account login method according to an embodiment of the present disclosure.

FIG. 8 is a schematic flowchart of another account login method according to an embodiment of the present disclosure. As shown in FIG. 8, the method in one embodiment of the present disclosure may include the following steps S201 to S209.

S201: A video terminal transmits a matching code obtaining request carrying a video terminal identifier to a service server, obtains a first matching code returned by the service server according to the matching code obtaining request, and outputs the first matching code.

Specifically, the video terminal may transmit the matching code obtaining request carrying the video terminal identifier to the service server. It is understood that the video terminal identifier may be an identification code that uniquely identifies the video terminal. For example, the video terminal identifier may be an ID of the video terminal. After receiving the matching code obtaining request, the service server randomly generates the first matching code according to the video terminal identifier, may store a correspondence between the video terminal identifier and the first matching code, and then returns the first matching code to the video terminal. It is understood that the first matching code may be practically an account randomly generated by the service server for login on the video terminal. For example, the first matching code may be a combination of one or more of digits, letters, special characters, and the like.

Further, the video terminal may output the first matching code. Optionally, the video terminal may display the first matching code in a video login interface shown in FIG. 4 or may read out the first matching code.

S202: A mobile terminal displays a login page correlated to the video terminal according to a selected login manner.

Specifically, as an authorization terminal of login on the video terminal, the mobile terminal may display the login page correlated to the video terminal according to a login manner selected by a user. It is understood that the login manner may include login via an official account or login via a website. The login page may be a mobile terminal login page that is displayed on the mobile terminal and is correlated to the video login interface after a login and authorization relationship is established between the mobile terminal and the video terminal, as shown in FIG. 5A.

S203: The mobile terminal obtains an inputted second matching code from the login page, and obtains the video terminal identifier from the service server based on the second matching code.

Specifically, the mobile terminal may obtain the inputted second matching code from the login page. It is understood that there is a correspondence between the first matching code and the second matching code. For example, the second matching code may be consistent with the first matching code (for example, the first matching code is 615842, and the inputted second matching code is also 615842). The second matching code may be alternatively a matching code that is obtained after the first matching code is correspondingly processed and has a correspondence with the first matching code (for example, the first matching code is 123456, and the second matching code may be 234567 obtained by adding 1 to every digit of the first matching code). It is understood that the corresponding processing may be a processing manner agreed in advance among the video terminal, the mobile terminal, and the service server. Different processing manners may be agreed according to IDs of different video terminals. After obtaining the second matching code, the mobile terminal may display the second matching code on the login page in the manner shown in FIG. 5B.

Further, the mobile terminal may transmit the second matching code to the service server. It is understood that because the service server stores a correspondence between the first matching code and the video terminal identifier, in response to determining that the received second matching code is the first matching code or has a correspondence with the first matching code, the service server may transmit the video terminal identifier to the mobile terminal.

Figure 5B:
FIG. 5B is a schematic diagram of a display effect of a second matching code on a mobile terminal according to an embodiment of the present disclosure.
Figure 5B:
Figure 5B:

In an embodiment, the mobile terminal may obtain an inputted voice matching code from the login page. It is understood that there is a correspondence between the first matching code and the voice matching code. For example, the voice matching code may be a matching code that is inputted in a voice form and has content consistent with that of the first matching code. Further, the mobile terminal may recognize matching code content corresponding to the voice matching code, and display the matching code content on the login page, as shown in FIG. 5B.

In one embodiment of the present disclosure, the mobile terminal obtains a matching code inputted by voice, thereby improving the accuracy of obtaining a matching code.

S204: The mobile terminal transmits a login authorization request to an application server, and obtains login authorization information returned by the application server.

Specifically, the mobile terminal may transmit the login authorization request to the application server based on an authorization application installed on the mobile terminal. It is understood that the authorization application may authorize the video terminal to perform login by using the application. The application server may return the login authorization information after receiving the login authorization request. It is understood that the login authorization information may be a virtual login account and password that are generated by the application server and are used by the video terminal to perform login.

S205: The mobile terminal transmits a login key request carrying the login authorization information and the video terminal identifier to the service server.

S206: The service server stores the login authorization information after receiving the login key request, and generates and returns a first video login key corresponding to the video terminal identifier.

Specifically, the service server may store the login authorization information after receiving the login key request. It is understood that the login authorization information may have a one-to-one correspondence with the video terminal identifier. Further, the service server may generate and return the first video login key corresponding to the video terminal identifier. It is understood that the first video login key may be formed by direction characters such as ↑, ↓, ←, and →. In a case that the login authorization information is similar to a virtual login account and password of the video terminal, the first video login key may ensure a correspondence between the mobile terminal and the video terminal, thereby implementing more secure login on the video terminal via the mobile terminal.

S207: The mobile terminal obtains the first video login key, and outputs the first video login key.

Specifically, the mobile terminal may obtain the first video login key that is returned by the service server and corresponds to the video terminal identifier, and may obtain the first video login key, and output the first video login key, for example, output the first login key "↑↓↑↑↓↓↑↓" shown in FIG. 6 or read out a login key formed by different direction characters and shown in FIG. 6.

S208: The video terminal obtains an inputted direction control instruction, and recognizes a second video login key indicated by the direction control instruction.

It is understood that the first video login key outputted by the mobile terminal may be a key that needs to be input to perform login on the video terminal. Specifically, the video terminal may obtain the direction control instruction inputted by using direction buttons on a video remote control device, and recognize the second video login key indicated by the direction control instruction. It is understood that there is a correspondence between the first video login key and the second video login key. For example, the second video login key may be consistent with the first video login key (for example, the first video login key is "↑↓↑↑↓↓↑↓", and the inputted second video login key is also "↑↓↑↑↓↓↑↓"). The second video login key may be alternatively a video login key that is obtained after the first video login key is correspondingly processed and has a correspondence with the first video login key (for example, the first video login key is "↑↓↑↑↓↓↑↓", and the second video login key may be "↑↓↑↑↓↓↑↓" obtained by inverting the first video login key). It is understood that the corresponding processing may be a processing manner agreed in advance among the video terminal, the mobile terminal, and the service server. Different processing manners may be agreed according to IDs of different video terminals.

In an embodiment, in a case that the direction control instruction is a voice direction control instruction, the video terminal may obtain the inputted voice direction control instruction, and transmit the voice direction control instruction to the service server. The service server may recognize instruction content of the voice direction control instruction, determine the second video login key according to the instruction content, and return the second video login key to the video terminal for display.

In one embodiment of the present disclosure, the video terminal obtains the voice direction control instruction, thereby implementing more accurate input of the second video login key.

S209: The video terminal obtains the login authorization information from the service server based on the video terminal identifier and the second video login key, and performs login on the video terminal according to the login authorization information.

It is understood that the login authorization information stored in the service server has a correspondence with the video terminal identifier and the first video login key. In a case that the service server determines that the second video login key is consistent with or has a correspondence with the first video login key, the video terminal may obtain the login authorization information from the service server based on the video terminal identifier and the second video login key, and may perform login on the video terminal according to the login authorization information.

In one embodiment of the present disclosure, before the video terminal performs login on the video terminal by using the login authorization information, the mobile terminal that authorizes login on the video terminal is specified based on the second video login key, thereby implementing more secure login on the video terminal.

Figure 9:
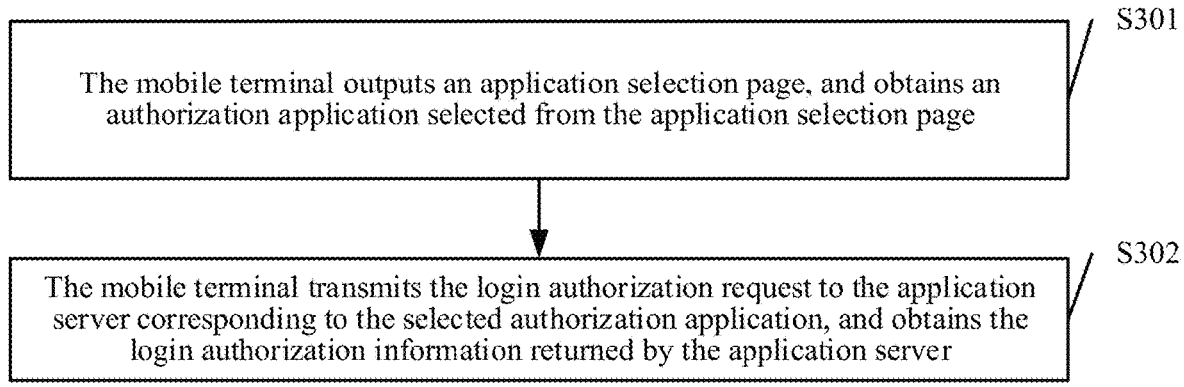
FIG. 9 is a schematic flowchart of another account login method according to an embodiment of the present disclosure.
Figure 10A:
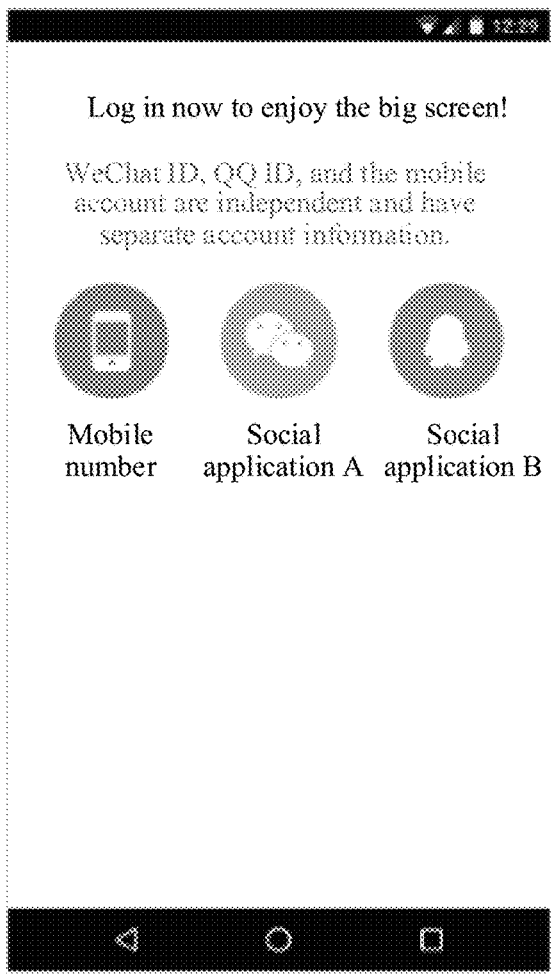
FIG. 10A is a schematic diagram of an authorization application selection page according to an embodiment of the present disclosure.
Figure 10B:
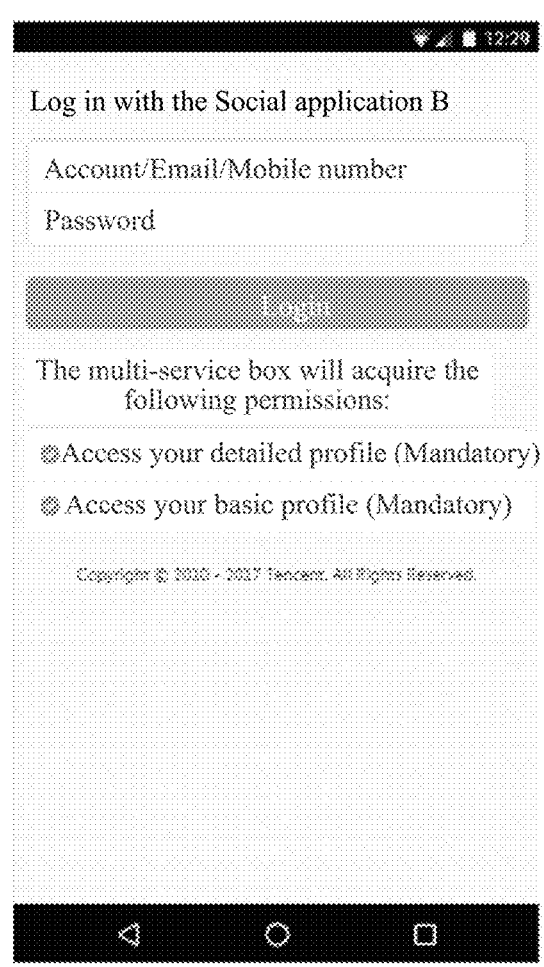
FIG. 10B is a schematic diagram of an authorization application login page according to an embodiment of the present disclosure.

In a specific implementation of one embodiment, the transmitting, by the mobile terminal, a login authorization request to an application server, and obtaining login authorization information returned by the application server may include the following steps, as shown in FIG. 9.

S301: The mobile terminal outputs an application selection page, and obtains an authorization application selected from the application selection page.

Specifically, the mobile terminal may output the application selection page, and may obtain the authorization application selected from the application selection page. It is understood that an authorization application on the application selection page may authorize the video terminal to perform login by using the application. The selected authorization application may be an application selected by a user to complete authorization of login on the video terminal. For example, the page in FIG. 10A may be the application selection page. Authorization applications that can be selected in FIG. 10A include an instant messaging application, a social application A, and a social application B.

S302: The mobile terminal transmits the login authorization request to the application server corresponding to the selected authorization application, and obtains the login authorization information returned by the application server.

Specifically, the mobile terminal may transmit the login authorization request to the application server corresponding to the selected authorization application. Optionally, the mobile terminal may transmit the login authorization request to the application server after obtaining a selection operation (for example, a tap operation) performed on the selected authorization application. Alternatively, the mobile terminal outputs and displays the authorization application login page shown in FIG. 10B after obtaining the selection operation, and transmits the login authorization request to the application server after login to the selected authorization application. The application server may return the login authorization information after receiving the login authorization request. It is understood that the login authorization information may be a login account and password that are generated by the application server and are used by the video terminal to perform login.

In one embodiment of the present disclosure, a video terminal obtains a first matching code from a service server based on a video terminal identifier, and outputs the first matching code. A mobile terminal obtains an inputted second matching code from a login page, and obtains the video terminal identifier from the service server based on the second matching code, there being a correspondence between the first matching code and the second matching code. Next, the mobile terminal transmits a login key request carrying the video terminal identifier to the service server, obtains a first video login key that is returned by the service server and corresponds to the video terminal identifier, and outputs the first video login key. Finally, the video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal. The mobile terminal obtains a matching code inputted by voice, thereby improving the accuracy of obtaining a matching code. The video terminal acquires a voice direction control instruction, so that the accuracy of inputting a second video login key is improved. Before the video terminal performs login on the video terminal by using login authorization information, the mobile terminal that authorizes login on the video terminal is specified based on the second video login key, thereby implementing more secure login on the video terminal.

Figure 11:
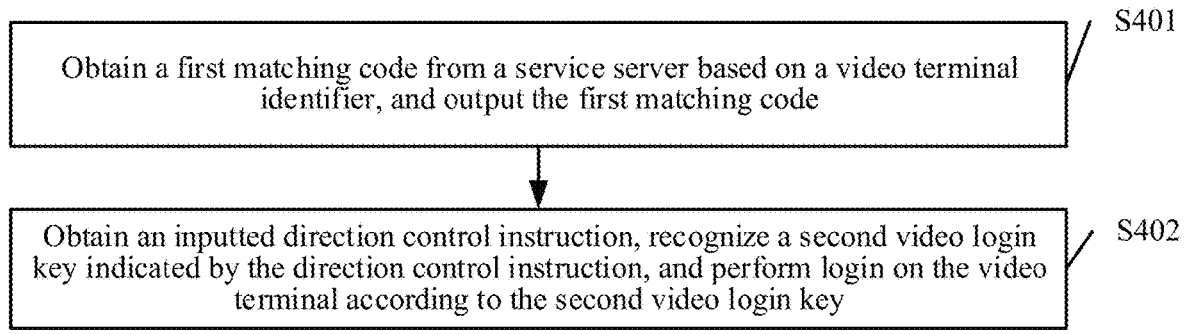
FIG. 11 is a schematic flowchart of another account login method according to an embodiment of the present disclosure.

FIG. 11 is a schematic flowchart of another account login method according to an embodiment of the present disclosure. As shown in FIG. 11, in one embodiment of the present disclosure, a specific procedure of the account login method is described on a video terminal side. The method may include the following steps S401 and S402.

S401: Obtain a first matching code from a service server based on a video terminal identifier, and output the first matching code.

Specifically, a video terminal may obtain the first matching code from the service server based on the video terminal identifier and output the first matching code. It is understood that the video terminal identifier may be an identification code that uniquely identifies the video terminal. For example, the video terminal identifier may be an ID of the video terminal. The first matching code may be practically an account randomly generated by the service server for login on the video terminal. For example, the first matching code may be a combination of one or more of digits, letters, special characters, and the like. It is understood that the video terminal may display the first matching code in a video login interface shown in FIG. 4 or may read out the first matching code.

In an embodiment, the video terminal may transmit a matching code obtaining request carrying the video terminal identifier to the service server. After receiving the matching code obtaining request, the service server randomly generates the first matching code according to the video terminal identifier, may store a correspondence between the video terminal identifier and the first matching code, and then returns the first matching code to the video terminal for output.

After the video terminal outputs the first matching code, a mobile terminal may display a login page correlated to the video terminal according to a login manner (for example, login via an official account or login via a website) selected by a user. The login page may be a mobile terminal login page that is displayed on the mobile terminal and is correlated to the video login interface after a login and authorization relationship is established between the mobile terminal and the video terminal, as shown in FIG. 5A. Further, the mobile terminal may obtain an inputted second matching code from the login page. It is understood that there is a correspondence between the first matching code and the second matching code. For example, the second matching code may be consistent with the first matching code (for example, the first matching code is 615842, and the inputted second matching code is also 615842). The second matching code may be alternatively a matching code that is obtained after the first matching code is correspondingly processed and has a correspondence with the first matching code (for example, the first matching code is 123456, and the second matching code may be 234567 obtained by adding 1 to every digit of the first matching code). It is understood that the corresponding processing may be a processing manner agreed in advance among the video terminal, the mobile terminal, and the service server. Different processing manners may be agreed according to IDs of different video terminals. After obtaining the second matching code, the mobile terminal may display the second matching code on the login page in the manner shown in FIG. 5B.

Further, the mobile terminal may obtain the video terminal identifier from the service server based on the second matching code. It is understood that because the service server stores a correspondence between the first matching code and the video terminal identifier, in response to determining that the inputted second matching code is the first matching code or has a correspondence with the first matching code, the service server may transmit the video terminal identifier to the mobile terminal.

S402: Obtain an inputted direction control instruction, recognize a second video login key indicated by the direction control instruction, and perform login on the video terminal according to the second video login key.

Specifically, the video terminal may obtain the direction control instruction inputted by using direction buttons on a video remote control device, and recognize the second video login key indicated by the direction control instruction. It is understood that there is a correspondence between the first video login key and the second video login key. For example, the second video login key may be consistent with the first video login key (for example, the first video login key is "↑↓↑↑↓↓↑↓", and the inputted second video login key is also "↑↓↑↑↓↓↑↓"). The second video login key may be alternatively a video login key that is obtained after the first video login key is correspondingly processed and has a correspondence with the first video login key (for example, the first video login key is "↑↓↑↑↓↓↑↓", and the second video login key may be "↑↓↑↑↓↓↑↓" obtained by inverting the first video login key). It is understood that the corresponding processing may be a processing manner agreed in advance among the video terminal, the mobile terminal, and the service server. Different processing manners may be agreed according to IDs of different video terminals.

The first video login key may be a login key that is randomly generated by the service server and is obtained by the mobile terminal after the mobile terminal transmits a login key request carrying the video terminal identifier to the service server. It is understood that the first video login key may be equivalent to a password corresponding to an account during login on the video terminal, and may be, for example, a login key formed by direction characters such as ↑, ↓, ←, and →. It is understood that there is a unique correspondence between the video terminal identifier and the first login key.

Further, after the video terminal recognizes the second video login key, a login interface of the video terminal may be shown in FIG. 7. The input similar to that of a login account and password has been completed, and login is completed on the video terminal.

In an embodiment, the direction control instruction is a voice direction control instruction. The video terminal may obtain the inputted voice direction control instruction, and transmit the voice direction control instruction to the service server. The service server may recognize the second video login key indicated by the voice direction control instruction and return the second video login key to the video terminal. The video terminal performs login on the video terminal according to the second video login key.

In one embodiment of the present disclosure, a video terminal obtains a first matching code from a service server based on a video terminal identifier, and outputs the first matching code. A mobile terminal obtains an inputted second matching code from a login page, and obtains the video terminal identifier from the service server based on the second matching code, there being a correspondence between the first matching code and the second matching code. Next, the mobile terminal transmits a login key request carrying the video terminal identifier to the service server, obtains a first video login key that is returned by the service server and corresponds to the video terminal identifier, and outputs the first video login key. Finally, the video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal.

Figure 12:
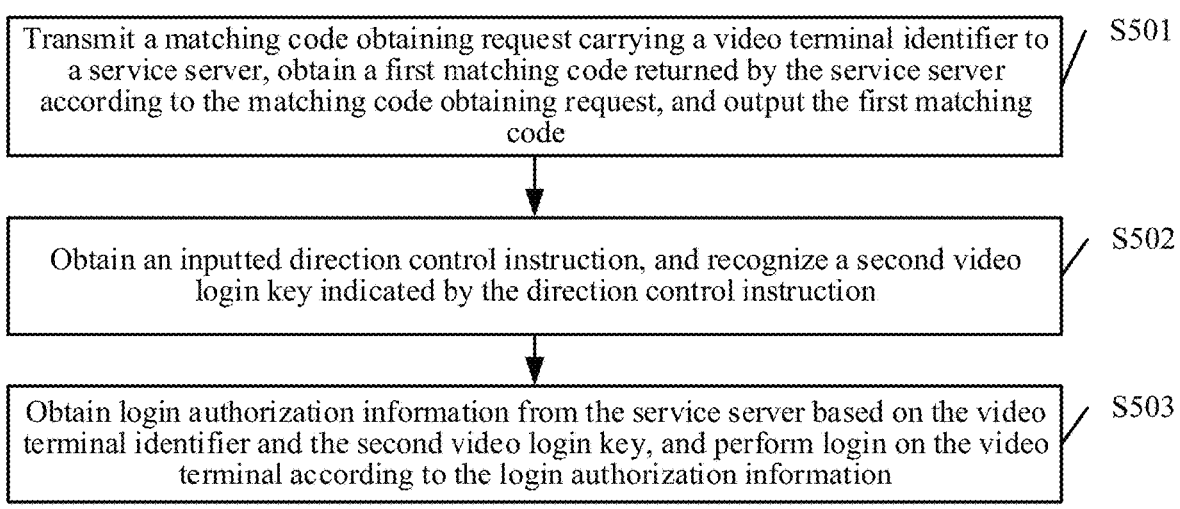
FIG. 12 is a schematic flowchart of still another account login method according to an embodiment of the present disclosure.

FIG. 12 is a schematic flowchart of still another account login method according to an embodiment of the present disclosure. As shown in FIG. 12, in one embodiment of the present disclosure, a specific procedure of the account login method is described on a video terminal side. The method may include the following steps S501 to S503.

S501: Transmit a matching code obtaining request carrying a video terminal identifier to a service server, obtain a first matching code returned by the service server according to the matching code obtaining request, and output the first matching code.

Specifically, a video terminal may transmit the matching code obtaining request carrying the video terminal identifier to the service server. It is understood that the video terminal identifier may be an identification code that uniquely identifies the video terminal. For example, the video terminal identifier may be an ID of the video terminal. After receiving the matching code obtaining request, the service server randomly generates the first matching code according to the video terminal identifier, may store a correspondence between the video terminal identifier and the first matching code, and then returns the first matching code to the video terminal. It is understood that the first matching code may be practically an account randomly generated by the service server for login on the video terminal. For example, the first matching code may be a combination of one or more of digits, letters, special characters, and the like.

Further, the video terminal may output the first matching code. Optionally, the video terminal may display the first matching code in a video login interface shown in FIG. 4 or may read out the first matching code.

After the video terminal outputs the first matching code, a mobile terminal may display a login page correlated to the video terminal according to a login manner (for example, login via an official account or login via a website) selected by a user. The login page may be a mobile terminal login page that is displayed on the mobile terminal and is correlated to the video login interface after a login and authorization relationship is established between the mobile terminal and the video terminal, as shown in FIG. 5A. Further, the mobile terminal may obtain an inputted second matching code from the login page. It is understood that there is a correspondence between the first matching code and the second matching code. For example, the second matching code may be consistent with the first matching code (for example, the first matching code is 615842, and the inputted second matching code is also 615842). The second matching code may be alternatively a matching code that is obtained after the first matching code is correspondingly processed and has a correspondence with the first matching code (for example, the first matching code is 123456, and the second matching code may be 234567 obtained by adding 1 to every digit of the first matching code). It is understood that the corresponding processing may be a processing manner agreed in advance among the video terminal, the mobile terminal, and the service server. Different processing manners may be agreed according to IDs of different video terminals. After obtaining the second matching code, the mobile terminal may display the second matching code on the login page in the manner shown in FIG. 5B.

Further, the mobile terminal may obtain the video terminal identifier from the service server based on the second matching code. It is understood that because the service server stores a correspondence between the first matching code and the video terminal identifier, in response to determining that the inputted second matching code is the first matching code or has a correspondence with the first matching code, the service server may transmit the video terminal identifier to the mobile terminal.

In an embodiment, the mobile terminal may obtain an inputted voice matching code from the login page. It is understood that there is a correspondence between the first matching code and the voice matching code. For example, the voice matching code may be a matching code that is inputted in a voice form and has content consistent with that of the first matching code. Further, the mobile terminal may recognize matching code content corresponding to the voice matching code, and display the matching code content on the login page, as shown in FIG. 5B.

In one embodiment of the present disclosure, the mobile terminal obtains a matching code inputted by voice, thereby improving the accuracy of obtaining a matching code.

S502: Obtain an inputted direction control instruction, and recognize a second video login key indicated by the direction control instruction.

It is understood that a first video login key outputted by the mobile terminal may be a key that needs to be input to perform login on the video terminal. Specifically, the video terminal may obtain the direction control instruction inputted by using direction buttons on a video remote control device, and recognize the second video login key indicated by the direction control instruction. It is understood that there is a correspondence between the first video login key and the second video login key. For example, the second video login key may be consistent with the first video login key (for example, the first video login key is "↑↓↑↑↓↓↑↓", and the inputted second video login key is also "↑↓↑↑↓↓↑↓"). The second video login key may be alternatively a video login key that is obtained after the first video login key is correspondingly processed and has a correspondence with the first video login key (for example, the first video login key is "↑↓↑↑↓↓↑↓", and the second video login key may be "↑↓↑↑↓↓↑↓" obtained by inverting the first video login key). It is understood that the corresponding processing may be a processing manner agreed in advance among the video terminal, the mobile terminal, and the service server. Different processing manners may be agreed according to IDs of different video terminals.

In an embodiment, in a case that the direction control instruction is a voice direction control instruction, the video terminal may obtain the inputted voice direction control instruction, and transmit the voice direction control instruction to the service server. The service server may recognize instruction content of the voice direction control instruction, determine the second video login key according to the instruction content, and return the second video login key to the video terminal for display.

In one embodiment of the present disclosure, the video terminal obtains the voice direction control instruction, thereby implementing more accurate input of the second video login key.

The first video login key may be a login key that is randomly generated by the service server and is obtained by the mobile terminal after the mobile terminal transmits a login key request carrying the video terminal identifier to the service server. It is understood that the first video login key may be equivalent to a password corresponding to an account during login on the video terminal, and may be, for example, a login key formed by direction characters such as ↑, ↓, ←, and →. It is understood that there is a unique correspondence between the video terminal identifier and the first login key.

S503: Obtain login authorization information from the service server based on the video terminal identifier and the second video login key, and perform login on the video terminal according to the login authorization information.

It is understood that the login authorization information stored in the service server has a correspondence with the video terminal identifier and the first video login key. In a case that the service server determines that the second video login key is consistent with or has a correspondence with the first video login key, the video terminal may obtain the login authorization information from the service server based on the video terminal identifier and the second video login key, and may perform login on the video terminal according to the login authorization information.

The login authorization information is login authorization information that is returned by an application server and is obtained by the mobile terminal after the mobile terminal transmits a login authorization request to the application server. Specifically, the mobile terminal may transmit the login authorization request to the application server based on an authorization application installed on the mobile terminal. It is understood that the authorization application may authorize the video terminal to perform login by using the application. The application server may return the login authorization information after receiving the login authorization request. It is understood that the login authorization information may be a virtual login account and password that are generated by the application server and are used by the video terminal to perform login.

In one embodiment of the present disclosure, before the video terminal performs login on the video terminal by using the login authorization information, the mobile terminal that authorizes login on the video terminal is specified based on the second video login key, thereby implementing more secure login on the video terminal.

In one embodiment of the present disclosure, a video terminal obtains a first matching code from a service server based on a video terminal identifier, and outputs the first matching code. A mobile terminal obtains an inputted second matching code from a login page, and obtains the video terminal identifier from the service server based on the second matching code, there being a correspondence between the first matching code and the second matching code. Next, the mobile terminal transmits a login key request carrying the video terminal identifier to the service server, obtains a first video login key that is returned by the service server and corresponds to the video terminal identifier, and outputs the first video login key. Finally, the video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal. The mobile terminal obtains a matching code inputted by voice, thereby improving the accuracy of obtaining a matching code. The video terminal acquires a voice direction control instruction, so that the accuracy of inputting a second video login key is improved. Before the video terminal performs login on the video terminal by using login authorization information, the mobile terminal that authorizes login on the video terminal is specified based on the second video login key, thereby implementing more secure login on the video terminal.

Figure 13:
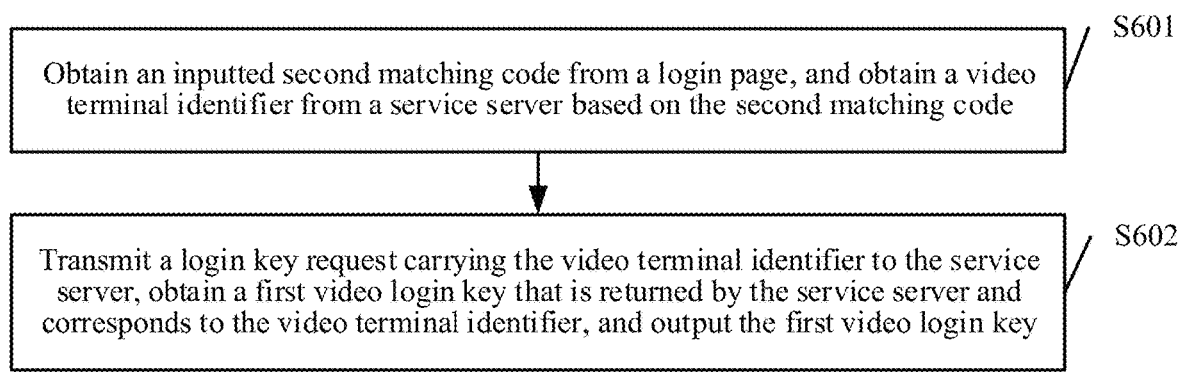
FIG. 13 is a schematic flowchart of still another account login method according to an embodiment of the present disclosure.

FIG. 13 is a schematic flowchart of still another account login method according to an embodiment of the present disclosure. As shown in FIG. 13, in one embodiment of the present disclosure, a specific procedure of the account login method is described on a mobile terminal side. The method may include the following steps S601 and S602.

S601: Obtain an inputted second matching code from a login page, and obtain a video terminal identifier from a service server based on the second matching code.

It is understood that a mobile terminal may display a login page correlated to a video terminal according to a login manner (for example, login via an official account or login via a website) selected by a user. The login page may be a mobile terminal login page that is displayed on the mobile terminal and is correlated to a video login interface after a login and authorization relationship is established between the mobile terminal and the video terminal, as shown in FIG. 5A.

Specifically, the mobile terminal may obtain the inputted second matching code from the login page. It is understood that the second matching code may be a matching code inputted according to a first matching code, and there is a correspondence between the first matching code and the second matching code. For example, the second matching code may be consistent with the first matching code (for example, the first matching code is 615842, and the inputted second matching code is also 615842). The second matching code may be alternatively a matching code that is obtained after the first matching code is correspondingly processed and has a correspondence with the first matching code (for example, the first matching code is 123456, and the second matching code may be 234567 obtained by adding 1 to every digit of the first matching code). It is understood that the corresponding processing may be a processing manner agreed in advance among the video terminal, the mobile terminal, and the service server. Different processing manners may be agreed according to IDs of different video terminals. After obtaining the second matching code, the mobile terminal may display the second matching code on the login page in the manner shown in FIG. 5B.

Further, the mobile terminal may obtain the video terminal identifier from the service server based on the second matching code. It is understood that because the service server stores a correspondence between the first matching code and the video terminal identifier, in response to determining that the inputted second matching code is the first matching code or has a correspondence with the first matching code, the service server may transmit the video terminal identifier to the mobile terminal.

The first matching code is a matching code obtained by the video terminal from the service server based on the video terminal identifier. It is understood that the video terminal identifier may be an identification code that uniquely identifies the video terminal. For example, the video terminal identifier may be an ID of the video terminal. The first matching code may be practically an account randomly generated by the service server for login on the video terminal. For example, the first matching code may be a combination of one or more of digits, letters, special characters, and the like. It is understood that the video terminal may display the first matching code in a video login interface shown in FIG. 4 or may read out the first matching code.

In an embodiment, the video terminal may transmit a matching code obtaining request carrying the video terminal identifier to the service server. After receiving the matching code obtaining request, the service server randomly generates the first matching code according to the video terminal identifier, may store a correspondence between the video terminal identifier and the first matching code, and then returns the first matching code to the video terminal for output.

S602: Transmit a login key request carrying the video terminal identifier to the service server, obtain a first video login key that is returned by the service server and corresponds to the video terminal identifier, and output the first video login key.

Specifically, after obtaining the video terminal identifier, the mobile terminal may transmit the login key request carrying the video terminal identifier to the service server. After receiving the login key request, the service server may randomly generate the first video login key. It is understood that the first video login key may be equivalent to a password corresponding to an account during login on the video terminal, and may be, for example, a login key formed by direction characters such as ↑, ↓, ←, and →. It is understood that there is a unique correspondence between the video terminal identifier and the first login key.

Further, the mobile terminal may obtain the first video login key that is returned by the service server and corresponds to the video terminal identifier, and may output the first video login key, for example, output the first login key "↑↓↑↑↓↓↑↓" shown in FIG. 6 or read out a login key formed by different direction characters and shown in FIG. 6.

It is understood that after the mobile terminal outputs the first video login key, the video terminal may obtain an inputted direction control instruction, and after recognizing a second video login key indicated by the direction control instruction, the video terminal performs login on the video terminal according to the second video login key. Specifically, the video terminal may obtain the direction control instruction inputted by using direction buttons on a video remote control device, and recognize the second video login key indicated by the direction control instruction. It is understood that there is a correspondence between the first video login key and the second video login key. For example, the second video login key may be consistent with the first video login key (for example, the first video login key is "↑↓↑↑↓↓↑↓", and the inputted second video login key is also "↑↓↑↑↓↓↑↓"). The second video login key may be alternatively a video login key that is obtained after the first video login key is correspondingly processed and has a correspondence with the first video login key (for example, the first video login key is "↑↓↑↑↓↓↑↓", and the second video login key may be "↓↑↓↓↑↑↓↑" obtained by inverting the first video login key). It is understood that the corresponding processing may be a processing manner agreed in advance among the video terminal, the mobile terminal, and the service server. Different processing manners may be agreed according to IDs of different video terminals.

Further, after the video terminal recognizes the second video login key, a login interface of the video terminal may be shown in FIG. 7. The input similar to that of a login account and password has been completed, and login is completed on the video terminal.

In an embodiment, the direction control instruction is a voice direction control instruction. The video terminal may obtain the inputted voice direction control instruction, and transmit the voice direction control instruction to the service server. The service server may recognize the second video login key indicated by the voice direction control instruction and return the second video login key to the video terminal. The video terminal performs login on the video terminal according to the second video login key.

In one embodiment of the present disclosure, a video terminal obtains a first matching code from a service server based on a video terminal identifier, and outputs the first matching code. A mobile terminal obtains an inputted second matching code from a login page, and obtains the video terminal identifier from the service server based on the second matching code, there being a correspondence between the first matching code and the second matching code. Next, the mobile terminal transmits a login key request carrying the video terminal identifier to the service server, obtains a first video login key that is returned by the service server and corresponds to the video terminal identifier, and outputs the first video login key. Finally, the video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal.

Figure 14:
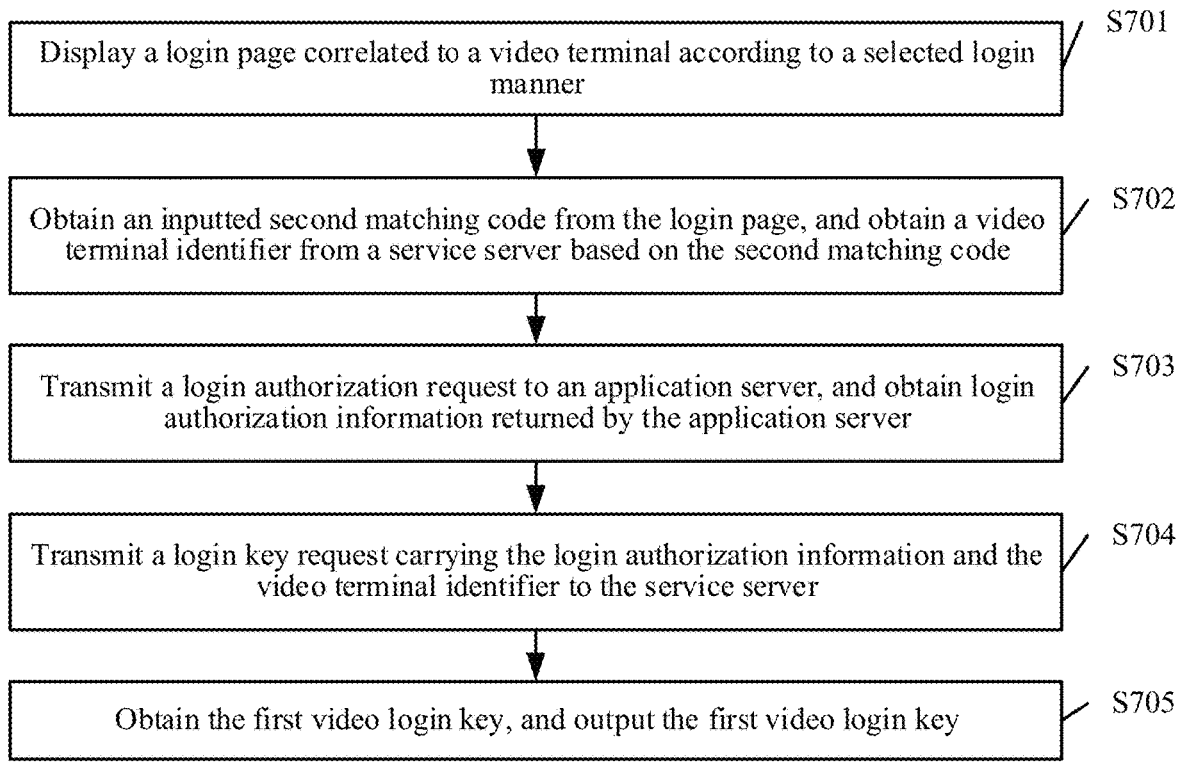
FIG. 14 is a schematic flowchart of still another account login method according to an embodiment of the present disclosure.

FIG. 14 is a schematic flowchart of still another account login method according to an embodiment of the present disclosure. As shown in FIG. 14, in one embodiment of the present disclosure, a specific procedure of the account login method is described on a mobile terminal side. The method may include the following steps S701 to S705.

S701: Display a login page correlated to a video terminal according to a selected login manner.

Specifically, as an authorization terminal of login on the video terminal, a mobile terminal may display the login page correlated to the video terminal according to a login manner selected by a user. It is understood that the login manner may include login via an official account or login via a website. The login page may be a mobile terminal login page that is displayed on the mobile terminal and is correlated to a video login interface after a login and authorization relationship is established between the mobile terminal and the video terminal, as shown in FIG. 5A.

S702: Obtain an inputted second matching code from the login page, and obtain a video terminal identifier from a service server based on the second matching code.

Specifically, the mobile terminal may obtain the inputted second matching code from the login page. It is understood that the second matching code may be a matching code inputted according to a first matching code, and there is a correspondence between the first matching code and the second matching code. For example, the second matching code may be consistent with the first matching code (for example, the first matching code is 615842, and the inputted second matching code is also 615842). The second matching code may be alternatively a matching code that is obtained after the first matching code is correspondingly processed and has a correspondence with the first matching code (for example, the first matching code is 123456, and the second matching code may be 234567 obtained by adding 1 to every digit of the first matching code). It is understood that the corresponding processing may be a processing manner agreed in advance among the video terminal, the mobile terminal, and the service server. Different processing manners may be agreed according to IDs of different video terminals. After obtaining the second matching code, the mobile terminal may display the second matching code on the login page in the manner shown in FIG. 5B.

Further, the mobile terminal may transmit the second matching code to the service server. It is understood that because the service server stores a correspondence between the first matching code and the video terminal identifier, in response to determining that the received second matching code is the first matching code or has a correspondence with the first matching code, the service server may transmit the video terminal identifier to the mobile terminal.

In an embodiment, the mobile terminal may obtain, on the login page, a voice matching code inputted according to the first matching code. It is understood that the voice matching code may be a matching code that is inputted in a voice form and has content consistent with that of the first matching code. Further, the mobile terminal may recognize matching code content corresponding to the voice matching code, and display the matching code content on the login page, as shown in FIG. 5B.

In one embodiment of the present disclosure, the mobile terminal obtains a matching code inputted by voice, thereby improving the accuracy of obtaining a matching code.

The first matching code is a matching code obtained by the video terminal from the service server based on the video terminal identifier. It is understood that the video terminal identifier may be an identification code that uniquely identifies the video terminal. For example, the video terminal identifier may be an ID of the video terminal. The first matching code may be practically an account randomly generated by the service server for login on the video terminal. For example, the first matching code may be a combination of one or more of digits, letters, special characters, and the like. It is understood that the video terminal may display the first matching code in a video login interface shown in FIG. 4 or may read out the first matching code.

In an embodiment, the video terminal may transmit a matching code obtaining request carrying the video terminal identifier to the service server. After receiving the matching code obtaining request, the service server randomly generates the first matching code according to the video terminal identifier, may store a correspondence between the video terminal identifier and the first matching code, and then returns the first matching code to the video terminal for output.

S703: Transmit a login authorization request to an application server, and obtain login authorization information returned by the application server.

Specifically, the mobile terminal may transmit the login authorization request to the application server based on an authorization application installed on the mobile terminal. It is understood that the authorization application may authorize the video terminal to perform login by using the application. The application server may return the login authorization information after receiving the login authorization request. It is understood that the login authorization information may be a virtual login account and password that are generated by the application server and are used by the video terminal to perform login.

S704: Transmit a login key request carrying the login authorization information and the video terminal identifier to the service server.

In one embodiment of the present disclosure, the service server may store the login authorization information after receiving the login key request. It is understood that the login authorization information may have a one-to-one correspondence with the video terminal identifier. Further, the service server may generate and return a first video login key corresponding to the video terminal identifier. It is understood that the first video login key may be formed by direction characters such as ↑, ↓, ←, and →. In a case that the login authorization information is similar to a virtual login account and password of the video terminal, the first video login key may ensure a correspondence between the mobile terminal and the video terminal, thereby implementing more secure login on the video terminal via the mobile terminal.

S705: Obtain the first video login key, and output the first video login key.

Specifically, the mobile terminal may obtain the first video login key that is returned by the service server and corresponds to the video terminal identifier, and may output the first video login key, for example, output the first login key "↑↓↑↑↓↓↑↓" shown in FIG. 6 or read out a login key formed by different direction characters and shown in FIG. 6.

It is understood that after the mobile terminal outputs the first video login key, the video terminal may obtain an inputted direction control instruction, and after recognizing a second video login key indicated by the direction control instruction, the video terminal performs login on the video terminal according to the second video login key. Specifically, the video terminal may obtain the direction control instruction inputted by using direction buttons on a video remote control device, and recognize the second video login key indicated by the direction control instruction. It is understood that there is a correspondence between the first video login key and the second video login key. For example, the second video login key may be consistent with the first video login key (for example, the first video login key is "↑↓↑↑↓↓↑↓", and the inputted second video login key is also "↑↓↑↑↓↓↑↓"). The second video login key may be alternatively a video login key that is obtained after the first video login key is correspondingly processed and has a correspondence with the first video login key (for example, the first video login key is "↑↓↑↑↓↓↑↓", and the second video login key may be "↑↓↑↑↓↓↑↓" obtained by inverting the first video login key). It is understood that the corresponding processing may be a processing manner agreed in advance among the video terminal, the mobile terminal, and the service server. Different processing manners may be agreed according to IDs of different video terminals.

Further, after the video terminal recognizes the second video login key, a login interface of the video terminal may be shown in FIG. 7. The input similar to that of a login account and password has been completed, and login is completed on the video terminal.

In an embodiment, the direction control instruction is a voice direction control instruction. The video terminal may obtain the inputted voice direction control instruction, and transmit the voice direction control instruction to the service server. The service server may recognize the second video login key indicated by the voice direction control instruction and return the second video login key to the video terminal. The video terminal performs login on the video terminal according to the second video login key.

Figure 15:
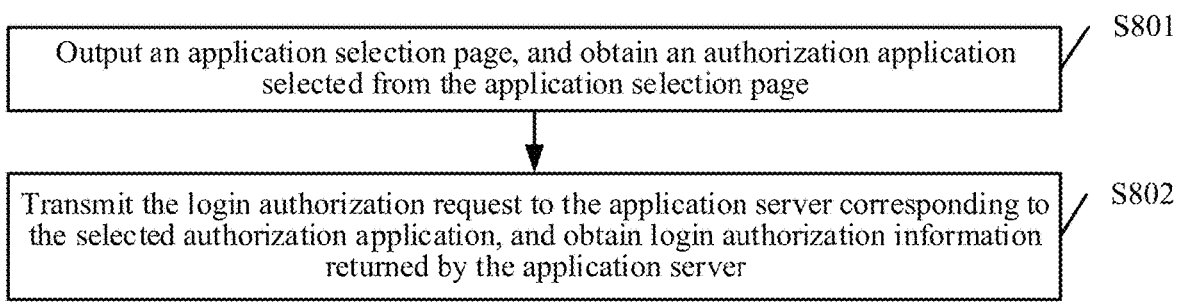
FIG. 15 is a schematic flowchart of still another account login method according to an embodiment of the present disclosure.

In a specific implementation of one embodiment, the transmitting a login authorization request to an application server, and obtaining login authorization information returned by the application server may include the following steps, as shown in FIG. 15.

S801: Output an application selection page, and obtain an authorization application selected from the application selection page.

Specifically, the mobile terminal may output the application selection page, and may obtain the authorization application selected from the application selection page. It is understood that an authorization application on the application selection page may authorize the video terminal to perform login by using the application. The selected authorization application may be an application selected by a user to complete authorization of login on the video terminal. For example, the page in FIG. 10A may be the application selection page. Authorization applications that can be selected in FIG. 10A include an instant messaging application, a social application A, and a social application B.

S802: Transmit the login authorization request to the application server corresponding to the selected authorization application, and obtain login authorization information returned by the application server.

Specifically, the mobile terminal may transmit the login authorization request to the application server corresponding to the selected authorization application. Optionally, the mobile terminal may transmit the login authorization request to the application server after obtaining a selection operation (for example, a tap operation) performed on the selected authorization application. Alternatively, the mobile terminal outputs and displays the authorization application login page shown in FIG. 10B after obtaining the selection operation, and transmits the login authorization request to the application server after login to the selected authorization application. The application server may return the login authorization information after receiving the login authorization request. It is understood that the login authorization information may be a login account and password that are generated by the application server and are used by the video terminal to perform login.

In one embodiment of the present disclosure, a video terminal obtains a first matching code from a service server based on a video terminal identifier, and outputs the first matching code. A mobile terminal obtains an inputted second matching code from a login page, and obtains the video terminal identifier from the service server based on the second matching code, there being a correspondence between the first matching code and the second matching code. Next, the mobile terminal transmits a login key request carrying the video terminal identifier to the service server, obtains a first video login key that is returned by the service server and corresponds to the video terminal identifier, and outputs the first video login key. Finally, the video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal. The mobile terminal obtains a matching code inputted by voice, thereby improving the accuracy of obtaining a matching code. The video terminal acquires a voice direction control instruction, so that the accuracy of inputting a second video login key is improved. Before the video terminal performs login on the video terminal by using login authorization information, the mobile terminal that authorizes login on the video terminal is specified based on the second video login key, thereby implementing more secure login on the video terminal.

Figure 16:
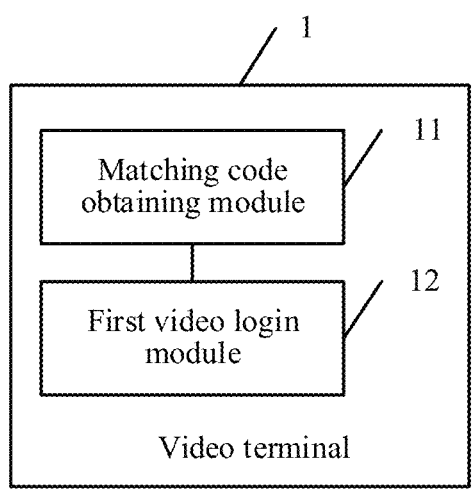
FIG. 16 is a schematic structural diagram of a video terminal according to an embodiment of the present disclosure.
Figure 17:
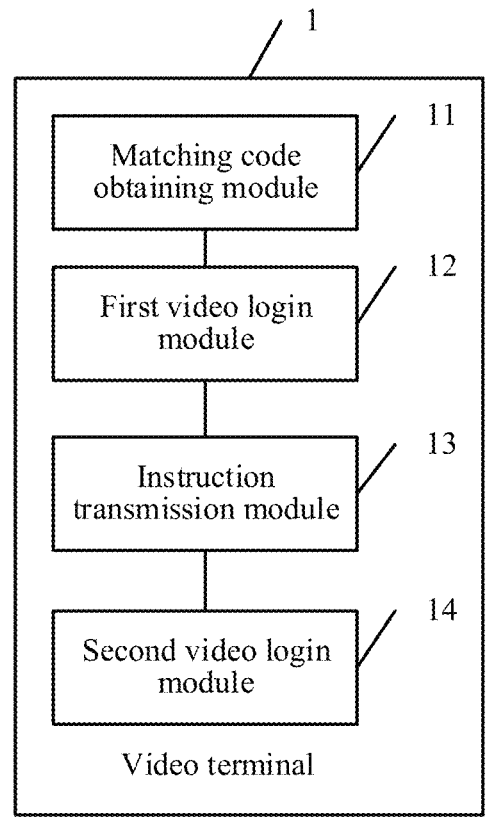
FIG. 17 is a schematic structural diagram of another video terminal according to an embodiment of the present disclosure.
Figure 18:
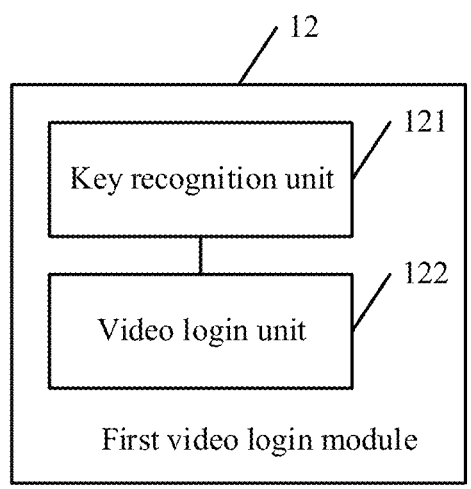
FIG. 18 is a schematic structural diagram of a first video login module according to an embodiment of the present disclosure.

The following describes the video terminal in the embodiments of the present disclosure in detail with reference to FIG. 16 to FIG. 18. The terminals shown in FIG. 16 to FIG. 18 are configured to perform the methods in the embodiments shown in FIG. 11 and FIG. 12 of the present disclosure. For ease of description, only a part related to the embodiments of the present disclosure is shown. For specific technical details that are not disclosed, refer to the embodiments shown in FIG. 11 and FIG. 12 of the present disclosure.

FIG. 16 is a schematic structural diagram of a video terminal according to an embodiment of the present disclosure. As shown in FIG. 16, a video terminal 1 in one embodiment of the present disclosure may include a matching code obtaining module 11 and a first video login module 12.

The matching code obtaining module 11 is configured to: obtain a first matching code from a service server based on a video terminal identifier, and output the first matching code.

In an embodiment, the matching code obtaining module 11 may transmit a matching code obtaining request carrying the video terminal identifier to a service server 3. After receiving the matching code obtaining request, the service server 3 randomly generates the first matching code according to the video terminal identifier, may store a correspondence between the video terminal identifier and the first matching code, and then returns the first matching code to the video terminal for output.

After the matching code obtaining module 11 outputs the first matching code, for a specific implementation process of obtaining the video terminal identifier by a mobile terminal, refer to the specific description in the foregoing method embodiments. Details are not described herein again.

The first video login module 12 is configured to: obtain an inputted direction control instruction, recognize a second video login key indicated by the direction control instruction, and perform login on the video terminal according to the second video login key.

In an embodiment, the direction control instruction is a voice direction control instruction. The video terminal 1 may obtain the inputted voice direction control instruction, and transmit the voice direction control instruction to the service server 3. The service server 3 may recognize the second video login key indicated by the voice direction control instruction and return the second video login key to the video terminal 1. The video terminal 1 performs login on the video terminal 1 according to the second video login key.

In one embodiment of the present disclosure, a video terminal obtains a first matching code from a service server based on a video terminal identifier, and outputs the first matching code. A mobile terminal obtains an inputted second matching code from a login page, and obtains the video terminal identifier from the service server based on the second matching code, there being a correspondence between the first matching code and the second matching code. Next, the mobile terminal transmits a login key request carrying the video terminal identifier to the service server, obtains a first video login key that is returned by the service server and corresponds to the video terminal identifier, and outputs the first video login key. Finally, the video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal.

FIG. 17 is a schematic structural diagram of another video terminal according to an embodiment of the present disclosure. As shown in FIG. 17, a video terminal 1 in one embodiment of the present disclosure may include a matching code obtaining module 11, a first video login module 12, an instruction transmission module 13, and a second video login module 14.

The matching code obtaining module 11 is configured to: transmit a matching code obtaining request carrying a video terminal identifier to a service server, obtain a first matching code returned by the service server according to the matching code obtaining request, and output the first matching code.

In an embodiment, a mobile terminal 2 may obtain an inputted voice matching code from a login page. It is understood that there is a correspondence between the first matching code and the voice matching code. For example, the voice matching code may be a matching code that is inputted in a voice form and has content consistent with that of the first matching code. Further, the mobile terminal 2 may recognize matching code content corresponding to the voice matching code, and display the matching code content on the login page, as shown in FIG. 5B.

In one embodiment of the present disclosure, the mobile terminal obtains a matching code inputted by voice, thereby improving the accuracy of obtaining a matching code.

The first video login module 12 is configured to: obtain an inputted direction control instruction, recognize a second video login key indicated by the direction control instruction, and perform login on the video terminal according to the second video login key.

Referring to FIG. 18 together, the first video login module 12 may include a key recognition unit 121 and a video login unit 122.

The key recognition unit 121 is configured to: obtain the inputted direction control instruction, and recognize the second video login key indicated by the direction control instruction.

In an embodiment, in a case that the direction control instruction is a voice direction control instruction, the instruction transmission module 13 may obtain the inputted voice direction control instruction, and transmit the voice direction control instruction to a service server 3. The service server 3 may recognize instruction content of the voice direction control instruction, determine the second video login key according to the instruction content, and return the second video login key to the video terminal 1 for display, so that the second video login module 14 can perform login on the video terminal according to the second video login key.

In one embodiment of the present disclosure, the video terminal obtains the voice direction control instruction, thereby implementing more accurate input of the second video login key.

The video login unit 122 is configured to: obtain login authorization information from the service server based on the video terminal identifier and the second video login key, and perform login on the video terminal according to the login authorization information.

It is understood that the login authorization information stored in the service server 3 has a correspondence with the video terminal identifier and the first video login key. In a case that the service server 3 determines that the second video login key is consistent with or has a correspondence with the first video login key, the video login unit 122 may obtain the login authorization information from the service server 3 based on the video terminal identifier and the second video login key, and may perform login on the video terminal 1 according to the login authorization information.

In one embodiment of the present disclosure, before the video terminal performs login on the video terminal by using the login authorization information, the mobile terminal that authorizes login on the video terminal is specified based on the second video login key, thereby implementing more secure login on the video terminal.

In one embodiment of the present disclosure, a video terminal obtains a first matching code from a service server based on a video terminal identifier, and outputs the first matching code. A mobile terminal obtains an inputted second matching code from a login page, and obtains the video terminal identifier from the service server based on the second matching code, there being a correspondence between the first matching code and the second matching code. Next, the mobile terminal transmits a login key request carrying the video terminal identifier to the service server, obtains a first video login key that is returned by the service server and corresponds to the video terminal identifier, and outputs the first video login key. Finally, the video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal. The mobile terminal obtains a matching code inputted by voice, thereby improving the accuracy of obtaining a matching code. The video terminal acquires a voice direction control instruction, so that the accuracy of inputting a second video login key is improved. Before the video terminal performs login on the video terminal by using login authorization information, the mobile terminal that authorizes login on the video terminal is specified based on the second video login key, thereby implementing more secure login on the video terminal.

An embodiment of the present disclosure further provides a computer-readable storage medium. The computer-readable storage medium may store computer-readable instructions. The instructions are configured to be loaded and executed by a processor to perform the steps in the methods in the embodiments shown in FIG. 11 and FIG. 12. For a specific execution procedure, refer to the specific description of the embodiments shown in FIG. 11 and FIG. 12. Details are not described herein.

Figure 19:
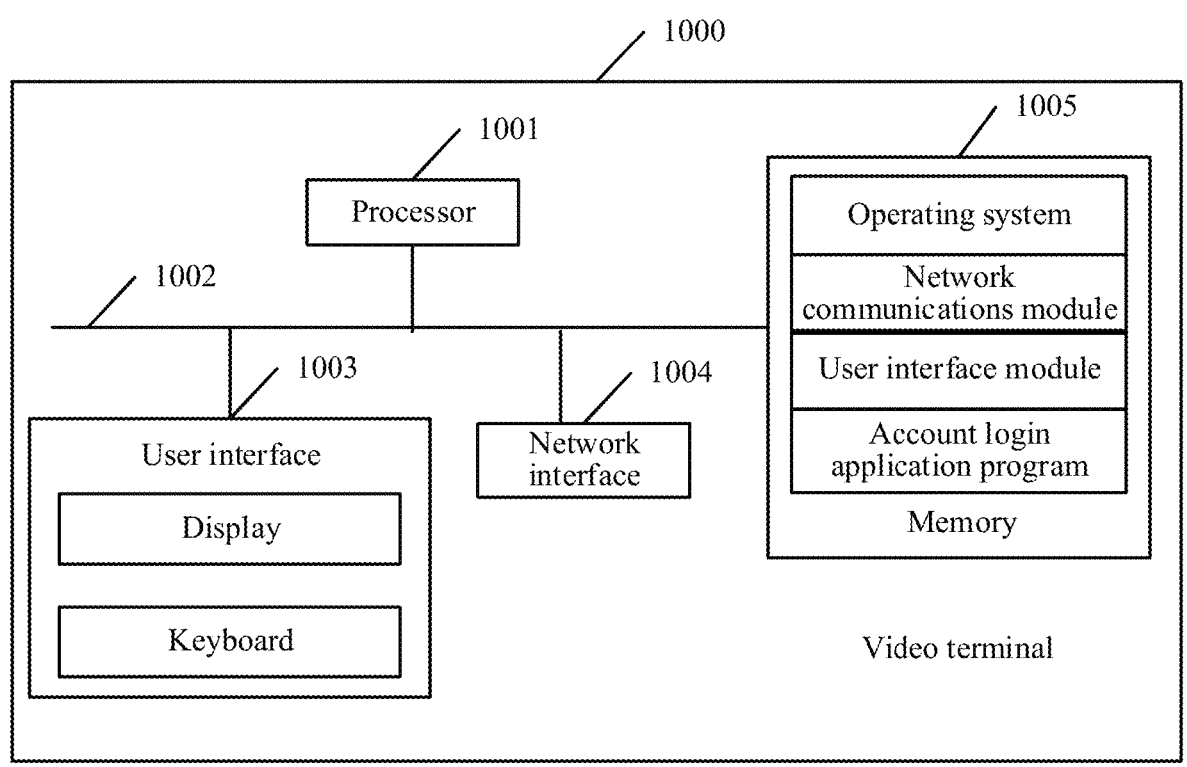
FIG. 19 is a schematic structural diagram of still another video terminal according to an embodiment of the present disclosure.

FIG. 19 is a schematic structural diagram of still another video terminal according to an embodiment of the present disclosure. As shown in FIG. 19, a video terminal 1000 may include at least one processor 1001 such as a CPU, at least one network interface 1004, a user interface 1003, a memory 1005, and at least one communications bus 1002. The communications bus 1002 is configured to implement connection and communication between these components. The user interface 1003 may include a display and a keyboard. Optionally, the user interface 1003 may further include a standard wired interface and wireless interface. The network interface 1004 may optionally include a standard wired interface and wireless interface (for example, a Wi-Fi interface). The memory 1005 may be a high-speed random access memory (RAM), or may be a non-volatile memory, for example, at least one magnetic disk memory. Optionally, the memory 1005 may be at least one storage apparatus that is located far away from the foregoing processor 1001. As shown in FIG. 19, the memory 1005, which is used as a computer-readable storage medium, may include an operating system, a network communications module, a user interface module, and an account login application program.

In the video terminal 1000 shown in FIG. 19, the user interface 1003 is mainly configured to: provide an input interface for a user, and obtain data inputted by the user. The network interface 1004 is configured to perform data communication with a user terminal. The processor 1001 may be configured to invoke the account login application program stored in the memory 1005 and specifically perform: obtaining a first matching code from a service server based on a video terminal identifier, and outputting the first matching code to enable a mobile terminal to obtain an inputted second matching code from a login page and enable the mobile terminal to obtain the video terminal identifier from the service server based on the second matching code, there being a correspondence between the first matching code and the second matching code; and obtaining an inputted direction control instruction, recognizing a second video login key indicated by the direction control instruction, and performing login on the video terminal according to the second video login key, the direction control instruction being an instruction inputted according to a first video login key, and there being a correspondence between the first video login key and the second video login key, the first video login key being an obtained login key that is returned by the service server and corresponds to the video terminal identifier after the mobile terminal transmits a login key request carrying the video terminal identifier to the service server.

In an embodiment, in response to performing the operation of obtaining a first matching code from a service server based on a video terminal identifier, and outputting the first matching code, the processor 1001 specifically performs: transmitting a matching code obtaining request carrying the video terminal identifier to the service server, obtaining the first matching code returned by the service server according to the matching code obtaining request, and outputting the first matching code.

In an embodiment, in response to performing the operation of obtaining an inputted direction control instruction, recognizing a second video login key indicated by the direction control instruction, and performing login on the video terminal according to the second video login key, the processor 1001 specifically performs: obtaining the inputted direction control instruction, and recognizing the second video login key indicated by the direction control instruction; and obtaining login authorization information from the service server based on the video terminal identifier and the second video login key, and performing login on the video terminal according to the login authorization information, where the login authorization information is login authorization information that is returned by an application server and is obtained by the mobile terminal after the mobile terminal transmits a login authorization request to the application server.

In an embodiment, the direction control instruction is a voice direction control instruction, and the processor 1001 is further configured to perform: obtaining the inputted voice direction control instruction, and transmitting the voice direction control instruction to the service server to enable the service server to recognize the second video login key indicated by the voice direction control instruction and return the second video login key; and performing login on the video terminal according to the second video login key.

In one embodiment of the present disclosure, a video terminal obtains a first matching code from a service server based on a video terminal identifier, and outputs the first matching code. A mobile terminal obtains an inputted second matching code from a login page, and obtains the video terminal identifier from the service server based on the second matching code, there being a correspondence between the first matching code and the second matching code. Next, the mobile terminal transmits a login key request carrying the video terminal identifier to the service server, obtains a first video login key that is returned by the service server and corresponds to the video terminal identifier, and outputs the first video login key. Finally, the video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal. The mobile terminal obtains a matching code inputted by voice, thereby improving the accuracy of obtaining a matching code. The video terminal acquires a voice direction control instruction, so that the accuracy of inputting a second video login key is improved. Before the video terminal performs login on the video terminal by using login authorization information, the mobile terminal that authorizes login on the video terminal is specified based on the second video login key, thereby implementing more secure login on the video terminal.

The following describes the mobile terminal in the embodiments of the present disclosure in detail with reference to FIG. 20 to FIG. 23. The terminals shown in FIG. 20 to FIG. 23 are configured to perform the methods in the embodiments shown in FIG. 13 to FIG. 15 of the present disclosure. For ease of description, only a part related to the embodiments of the present disclosure is shown. For specific technical details that are not disclosed, refer to the embodiments shown in FIG. 13 to FIG. 15 of the present disclosure.

Figure 20:
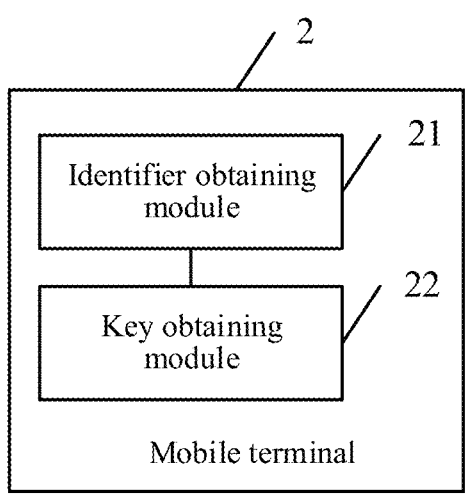
FIG. 20 is a schematic structural diagram of a mobile terminal according to an embodiment of the present disclosure.

FIG. 20 is a schematic structural diagram of a mobile terminal according to an embodiment of the present disclosure. As shown in FIG. 20, the mobile terminal 2 in one embodiment of the present disclosure may include an identifier obtaining module 21 and a key obtaining module 22.

The identifier obtaining module 21 is configured to: obtain an inputted second matching code from a login page, and obtain a video terminal identifier from the service server based on the second matching code.

In an embodiment, a video terminal 1 may transmit a matching code obtaining request carrying the video terminal identifier to a service server 3. After receiving the matching code obtaining request, the service server 3 randomly generates a first matching code according to the video terminal identifier, may store a correspondence between the video terminal identifier and the first matching code, and then returns the first matching code to the video terminal 1 for output.

The key obtaining module 22 is configured to: transmit a login key request carrying the video terminal identifier to the service server, obtain a first video login key that is returned by the service server and corresponds to the video terminal identifier, and output the first video login key.

In an embodiment, a direction control instruction is a voice direction control instruction. The video terminal 1 may obtain the inputted voice direction control instruction, and transmit the voice direction control instruction to the service server 3. The service server 3 may recognize a second video login key indicated by the voice direction control instruction and return the second video login key to the video terminal 1. The video terminal 1 performs login on the video terminal 1 according to the second video login key.

In one embodiment of the present disclosure, a video terminal obtains a first matching code from a service server based on a video terminal identifier, and outputs the first matching code. A mobile terminal obtains an inputted second matching code from a login page, and obtains the video terminal identifier from the service server based on the second matching code, there being a correspondence between the first matching code and the second matching code. Next, the mobile terminal transmits a login key request carrying the video terminal identifier to the service server, obtains a first video login key that is returned by the service server and corresponds to the video terminal identifier, and outputs the first video login key. Finally, the video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal.

Figure 21:
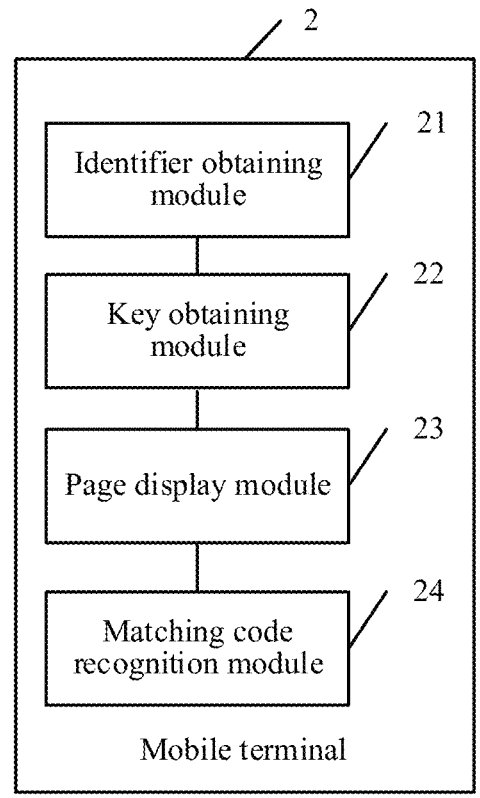
FIG. 21 is a schematic structural diagram of another mobile terminal according to an embodiment of the present disclosure.

FIG. 21 is a schematic structural diagram of another mobile terminal according to an embodiment of the present disclosure. As shown in FIG. 21, the mobile terminal 2 in one embodiment of the present disclosure may include an identifier obtaining module 21, a key obtaining module 22, a page display module 23, and a matching code recognition module 24.

The page display module 23 is configured to display a login page correlated to a video terminal according to a selected login manner.

The identifier obtaining module 21 is configured to: obtain an inputted second matching code from the login page, and obtain a video terminal identifier from a service server based on the second matching code.

In an embodiment, the matching code recognition module 24 may obtain, on the login page, a voice matching code inputted according to a first matching code. It is understood that the voice matching code may be a matching code that is inputted in a voice form and has content consistent with that of the first matching code. Further, the matching code recognition module 24 may recognize matching code content corresponding to the voice matching code, and display the matching code content on the login page, as shown in FIG. 5B.

In one embodiment of the present disclosure, the mobile terminal obtains a matching code inputted by voice, thereby improving the accuracy of obtaining a matching code.

In an embodiment, a video terminal 1 may transmit a matching code obtaining request carrying the video terminal identifier to a service server 3. After receiving the matching code obtaining request, the service server 3 randomly generates the first matching code according to the video terminal identifier, may store a correspondence between the video terminal identifier and the first matching code, and then returns the first matching code to the video terminal 1 for output.

The key obtaining module 22 is configured to: transmit a login key request carrying the video terminal identifier to the service server, obtain a first video login key that is returned by the service server and corresponds to the video terminal identifier, and output the first video login key.

Figure 22:
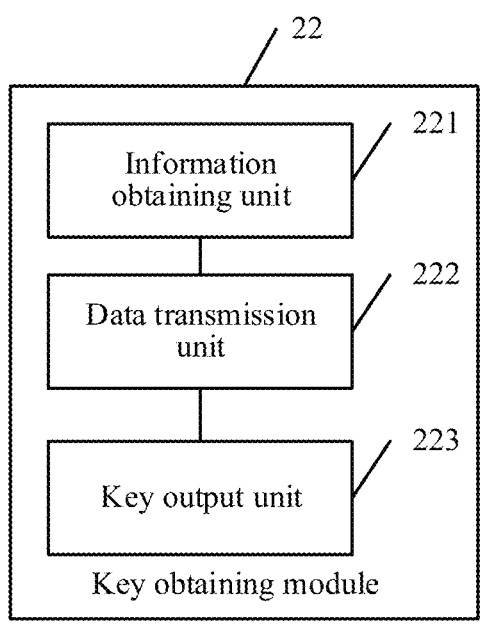
FIG. 22 is a schematic structural diagram of a key obtaining module according to an embodiment of the present disclosure.

Referring to FIG. 22 together, the key obtaining module 22 may include an information obtaining unit 221, a data transmission unit 222, and a key output unit 223.

The information obtaining unit 221 is configured to: transmit a login authorization request to an application server, and obtain login authorization information returned by the application server.

Figure 23:
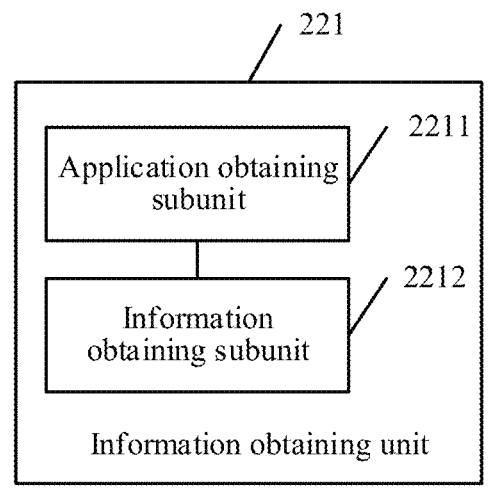
FIG. 23 is a schematic structural diagram of an information obtaining unit according to an embodiment of the present disclosure.

Referring to FIG. 23 together, the information obtaining unit 221 may include an application obtaining subunit 2211 an information obtaining subunit 2212.

The application obtaining subunit 2211 is configured to: output an application selection page, and obtain an authorization application selected from the application selection page.

The information obtaining subunit 2212 is configured to: transmit the login authorization request to the application server corresponding to the selected authorization application, and obtain the login authorization information returned by the application server.

The data transmission unit 222 is configured to transmit the login key request carrying the login authorization information and the video terminal identifier to the service server.

In one embodiment of the present disclosure, the data transmission unit 222 may transmit the login key request carrying the login authorization information and the video terminal identifier to the service server 3. The service server 3 may store the login authorization information after receiving the login key request. It is understood that the login authorization information may have a one-to-one correspondence with the video terminal identifier. Further, the service server 3 may generate and return the first video login key corresponding to the video terminal identifier. It is understood that the first video login key may be formed by direction characters such as ↑, ↓, ←, and →. In a case that the login authorization information is similar to a virtual login account and password of the video terminal 1, the first video login key may ensure a correspondence between the mobile terminal 2 and the video terminal 1, thereby implementing more secure login on the video terminal 1 via the mobile terminal 2.

The key output unit 223 is configured to obtain the first video login key, and output the first video login key.

In an embodiment, a direction control instruction is a voice direction control instruction. The video terminal 1 may obtain the inputted voice direction control instruction, and transmit the voice direction control instruction to the service server 3. The service server 3 may recognize a second video login key indicated by the voice direction control instruction and return the second video login key to the video terminal 1. The video terminal 1 performs login on the video terminal 1 according to the second video login key.

In one embodiment of the present disclosure, a video terminal obtains a first matching code from a service server based on a video terminal identifier, and outputs the first matching code. A mobile terminal obtains an inputted second matching code from a login page, and obtains the video terminal identifier from the service server based on the second matching code, there being a correspondence between the first matching code and the second matching code. Next, the mobile terminal transmits a login key request carrying the video terminal identifier to the service server, obtains a first video login key that is returned by the service server and corresponds to the video terminal identifier, and outputs the first video login key. Finally, the video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal. The mobile terminal obtains a matching code inputted by voice, thereby improving the accuracy of obtaining a matching code. The video terminal acquires a voice direction control instruction, so that the accuracy of inputting a second video login key is improved. Before the video terminal performs login on the video terminal by using login authorization information, the mobile terminal that authorizes login on the video terminal is specified based on the second video login key, thereby implementing more secure login on the video terminal.

An embodiment of the present disclosure further provides a computer-readable storage medium. The computer-readable storage medium may store computer-readable instructions. The instructions are configured to be loaded and executed by a processor to perform the steps in the methods in the embodiments shown in FIG. 13 to FIG. 15. For a specific execution procedure, refer to the specific description of the embodiments shown in FIG. 13 to FIG. 15. Details are not described herein.

Figure 24:
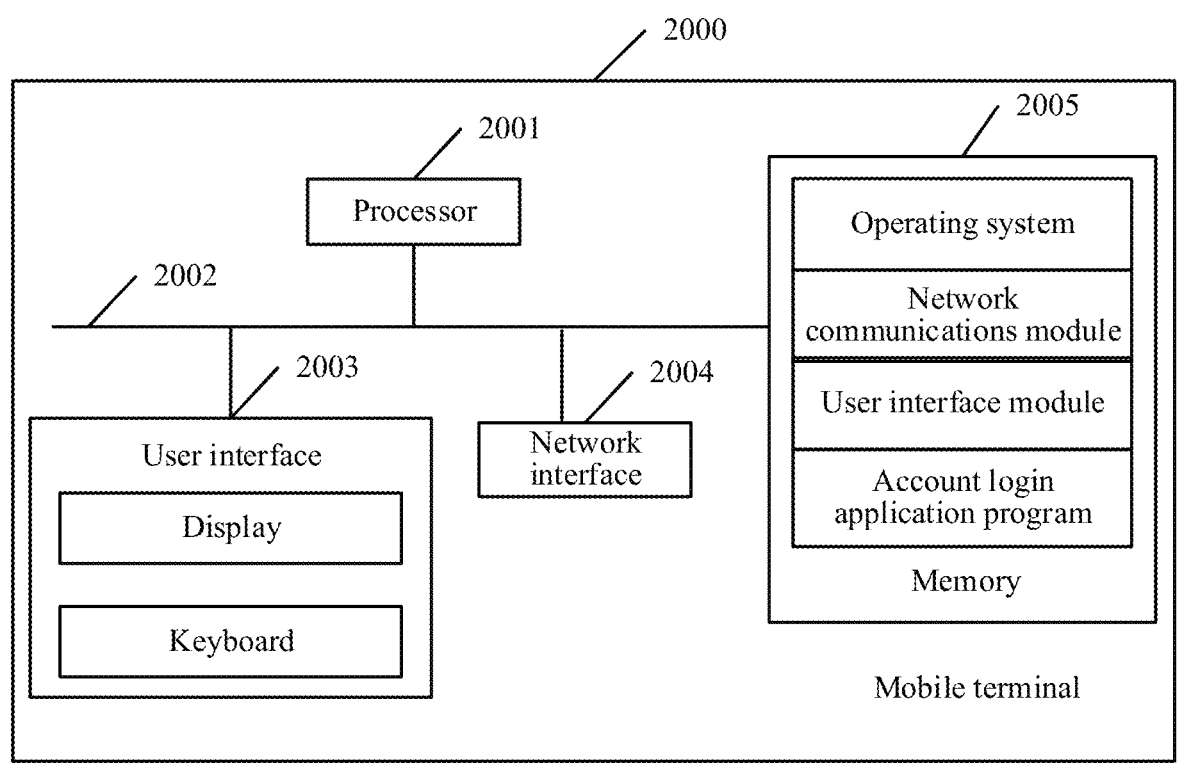
FIG. 24 is a schematic structural diagram of still another mobile terminal according to an embodiment of the present disclosure.

FIG. 24 is a schematic structural diagram of still another mobile terminal according to an embodiment of the present disclosure. As shown in FIG. 24, a mobile terminal 2000 may include: at least one processor 2001, for example, a CPU, at least one network interface 2004, a user interface 2003, a memory 2005, and at least one communications bus 2002. The communications bus 2002 is configured to implement connection and communication between these components. The user interface 2003 may include a display and a keyboard. Optionally, the user interface 2003 may further include a standard wired interface and wireless interface. The network interface 2004 may optionally include a standard wired interface and wireless interface (for example, a Wireless Fidelity (Wi-Fi) interface). The memory 2005 may be a high-speed RAM, or may be a non-volatile memory, for example, at least one magnetic disk memory. Optionally, the memory 2005 may be at least one storage apparatus that is located far away from the foregoing processor 2001. As shown in FIG. 21, the memory 2005, which is used as a computer-readable storage medium, may include an operating system, a network communications module, a user interface module, and an account login application program.

In the mobile terminal 2000 shown in FIG. 24, the user interface 2003 is mainly configured to: provide an input interface for a user, and obtain data inputted by the user. The network interface 2004 is configured to perform data communication with a user terminal. The processor 2001 may be configured to invoke the account login application program stored in the memory 2005 and specifically perform: obtaining an inputted second matching code from a login page, and obtaining a video terminal identifier from a service server based on the second matching code, the second matching code being inputted according to the first matching code, and there being a correspondence between the first matching code and the second matching code; and transmitting a login key request carrying the video terminal identifier to the service server, obtaining a first video login key that is returned by the service server and corresponds to the video terminal identifier, and outputting the first video login key to enable a video terminal to obtain an inputted direction control instruction and recognize a second video login key indicated by the direction control instruction and enable the video terminal to perform login on the video terminal according to the second video login key, there being a correspondence between the first video login key and the second video login key, the first matching code being a matching code obtained by the video terminal from the service server based on the video terminal identifier.

In an embodiment, before performing the operation of obtaining the inputted second matching code from the login page, the processor 2001 is further configured to perform: displaying the login page correlated to the video terminal according to a selected login manner.

In an embodiment, in response to performing the operation of transmitting a login key request carrying the video terminal identifier to the service server, obtaining a first video login key that is returned by the service server and corresponds to the video terminal identifier, and outputting the first video login key, the processor 2001 specifically performs: transmitting a login authorization request to an application server, and obtaining login authorization information returned by the application server; transmitting the login key request carrying the login authorization information and the video terminal identifier to the service server to enable the service server to store the login authorization information after receiving the login key request and enable the service server to generate and return the first video login key corresponding to the video terminal identifier; and obtaining the first video login key, and outputting the first video login key.

In an embodiment, in response to performing the operation of transmitting a login authorization request to an application server, and obtaining login authorization information returned by the application server, the processor 2001 specifically performs: outputting an application selection page, and obtaining an authorization application selected from the application selection page; and transmitting the login authorization request to the application server corresponding to the selected authorization application, and obtaining the login authorization information returned by the application server.

In an embodiment, the processor 2001 is further configured to perform: obtaining an inputted voice matching code from the login page, recognizing matching code content corresponding to the voice matching code, and displaying the matching code content on the login page, where there is a correspondence between the first matching code and the voice matching code.

In one embodiment of the present disclosure, a video terminal obtains a first matching code from a service server based on a video terminal identifier, and outputs the first matching code. A mobile terminal obtains an inputted second matching code from a login page, and obtains the video terminal identifier from the service server based on the second matching code, there being a correspondence between the first matching code and the second matching code. Next, the mobile terminal transmits a login key request carrying the video terminal identifier to the service server, obtains a first video login key that is returned by the service server and corresponds to the video terminal identifier, and outputs the first video login key. Finally, the video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal.

Figure 25:
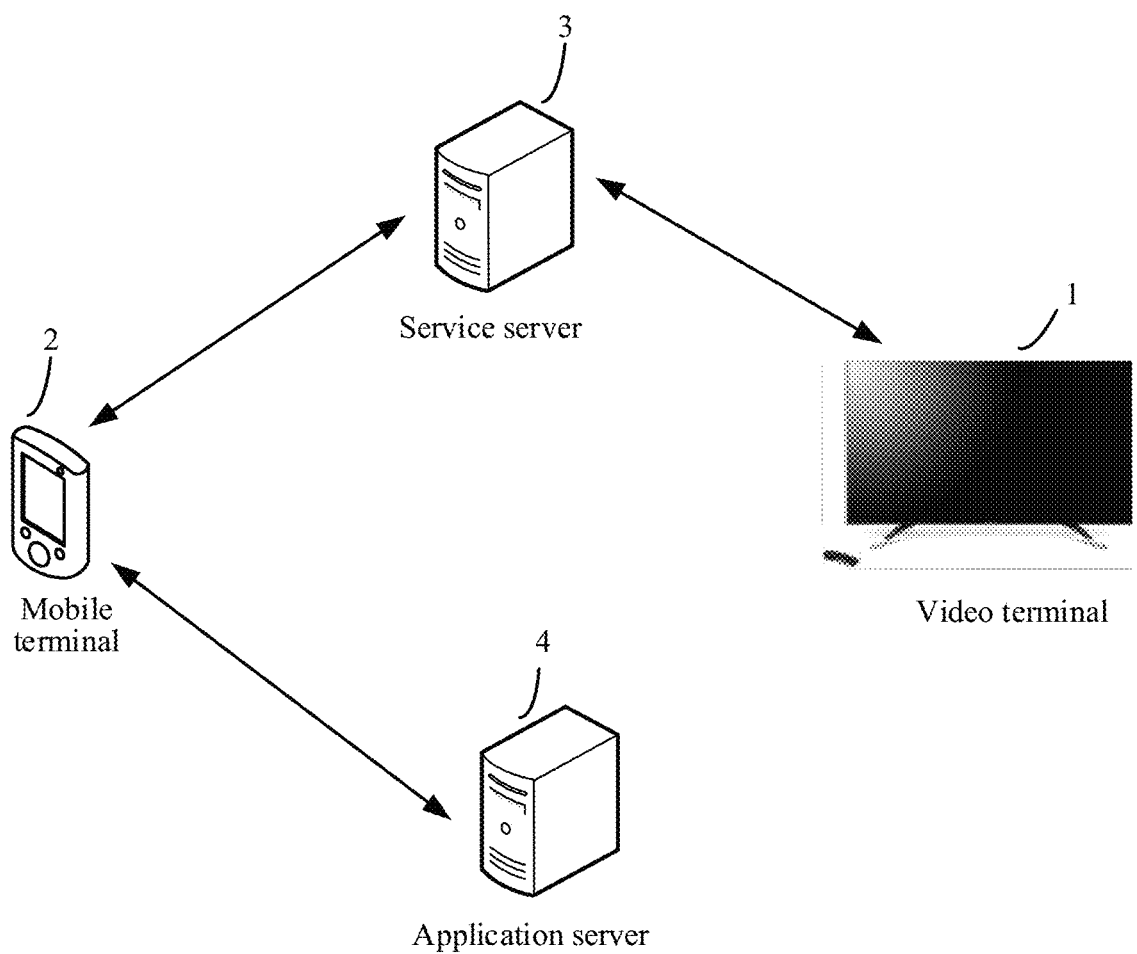
FIG. 25 is a schematic structural diagram of an account login system according to an embodiment of the present disclosure.

FIG. 25 is a schematic structural diagram of an account login system according to an embodiment of the present disclosure. As shown in FIG. 25, the system may include a video terminal 1, a mobile terminal 2, a service server 3, and an application server 4. The video terminal 1 and the service server 3 may be connected by a network, the mobile terminal 2 and the service server 3 may be connected by a network, and the mobile terminal 2 and the application server 4 may be connected by a network. The video terminal 1 is specifically the video terminal 1 in the embodiments shown in FIG. 16 to FIG. 18, and the mobile terminal 2 is specifically the mobile terminal 2 in the embodiment shown in any one of FIG. 20 to FIG. 23. Alternatively, the video terminal 1 may be the video terminal 1000 in the embodiment shown in FIG. 19, and the mobile terminal 2 may be the mobile terminal 2000 in the embodiment shown in FIG. 24.

The video terminal 1 is configured to: obtain a first matching code from a service server based on a video terminal identifier, and output the first matching code.

The mobile terminal 2 is configured to: obtain an inputted second matching code from a login page, and obtain the video terminal identifier from the service server based on the second matching code, there being a correspondence between the first matching code and the second matching code.

The mobile terminal 2 is configured to: transmit a login key request carrying the video terminal identifier to the service server, obtain a first video login key that is returned by the service server and corresponds to the video terminal identifier, obtain the first video login key, and output the first video login key.

The video terminal 1 is configured to: obtain an inputted direction control instruction, recognize a second video login key indicated by the direction control instruction, and perform login on the video terminal according to the second video login key, there being a correspondence between the first video login key and the second video login key.

In an embodiment, the video terminal 1 is further configured to: transmit a matching code obtaining request carrying the video terminal identifier to the service server, obtain the first matching code returned by the service server according to the matching code obtaining request, and output the first matching code.

In an embodiment, before the mobile terminal 2 obtains the inputted second matching code from the login page, the mobile terminal 2 is configured to display the login page correlated to the video terminal according to a selected login manner.

In an embodiment, the mobile terminal 2 is further configured to: transmit a login authorization request to an application server, and obtain login authorization information returned by the application server; the mobile terminal 2 is further configured to transmit the login key request carrying the login authorization information and the video terminal identifier to the service server; the service server 3 is configured to: store the login authorization information after receiving the login key request, and generate and return the first video login key corresponding to the video terminal identifier; and the mobile terminal 2 is further configured to: obtain the first video login key, and output the first video login key.

In an embodiment, the video terminal 1 is further configured to: obtain the inputted direction control instruction, and recognize the second video login key indicated by the direction control instruction.

The video terminal 1 is further configured to: obtain the login authorization information from the service server based on the video terminal identifier and the second video login key, and perform login on the video terminal according to the login authorization information.

In an embodiment, the mobile terminal 2 is further configured to: output an application selection page, and obtain an authorization application selected from the application selection page; and the mobile terminal 2 is further configured to: transmit the login authorization request to the application server corresponding to the selected authorization application, and obtain the login authorization information returned by the application server.

In an embodiment, the mobile terminal 2 is further configured to: obtain an inputted voice matching code from the login page, recognize matching code content corresponding to the voice matching code, and display the matching code content on the login page, where there is a correspondence between the first matching code and the voice matching code.

In an embodiment, the direction control instruction is a voice direction control instruction, the video terminal 1 is further configured to: obtain the inputted voice direction control instruction, and transmit the voice direction control instruction to the service server; the service server 3 is further configured to: recognize the second video login key indicated by the voice direction control instruction, and transmit the second video login key to the video terminal; and the video terminal 1 is further configured to perform login on the video terminal according to the second video login key.

In one embodiment of the present disclosure, a video terminal obtains a first matching code from a service server based on a video terminal identifier, and outputs the first matching code. A mobile terminal obtains an inputted second matching code from a login page, and obtains the video terminal identifier from the service server based on the second matching code, there being a correspondence between the first matching code and the second matching code. Next, the mobile terminal transmits a login key request carrying the video terminal identifier to the service server, obtains a first video login key that is returned by the service server and corresponds to the video terminal identifier, and outputs the first video login key. Finally, the video terminal obtains an inputted direction control instruction, recognizes a second video login key indicated by the direction control instruction, and performs login on the video terminal according to the second video login key, there being a correspondence between the first video login key and the second video login key. The mobile terminal obtains a login key carrying the direction control instruction from the service server, so that a process of performing login on the video terminal by using the direction control instruction is implemented, a process of inputting an account and a password is simplified, and the accuracy of input is improved, thereby improving the efficiency of login on the video terminal. The mobile terminal obtains a matching code inputted by voice, thereby improving the accuracy of obtaining a matching code. The video terminal acquires a voice direction control instruction, so that the accuracy of inputting a second video login key is improved. Before the video terminal performs login on the video terminal by using login authorization information, the mobile terminal that authorizes login on the video terminal is specified based on the second video login key, thereby implementing more secure login on the video terminal.

A person of ordinary skill in the art may understand that some or all procedures in the method in the foregoing embodiments may be implemented by computer-readable instructions instructing related hardware, the program may be stored in a computer-readable storage medium, and when the program is executed, the procedures in the foregoing method embodiments may be implemented. The storage medium may be a magnetic disk, an optical disc, a read-only memory (ROM), a RAM or the like.

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. An account login method, comprising:
   obtaining, by a video terminal, a first matching code from a service server based on a video terminal identifier, and outputting the first matching code;
   obtaining, by a mobile terminal, an inputted second matching code from a login page, and obtaining the video terminal identifier from the service server based on the second matching code, there being a correspondence between the first matching code and the second matching code;
   transmitting, by the mobile terminal, a login key request carrying the video terminal identifier to the service server, obtaining a first video login key that is returned by the service server and corresponds to the video terminal identifier, and outputting the first video login key; and
   obtaining, by the video terminal, an inputted direction control instruction, recognizing a second video login key indicated by the direction control instruction, and performing login on the video terminal according to the second video login key, there being a correspondence between the first video login key and the second video login key.

2. The method according to claim 1, wherein the obtaining, by a video terminal, a first matching code from a service server based on a video terminal identifier, and outputting the first matching code comprises:
   transmitting, by the video terminal, a matching code obtaining request carrying the video terminal identifier to the service server, obtaining the first matching code returned by the service server according to the matching code obtaining request, and outputting the first matching code.

3. The method according to claim 1, before the obtaining, by a mobile terminal, an inputted second matching code from a login page, further comprising:
displaying, by the mobile terminal, the login page correlated to the video terminal according to a selected login manner.

4. The method according to claim 1, wherein the transmitting, by the mobile terminal, a login key request carrying the video terminal identifier to the service server, obtaining a first video login key that is returned by the service server and corresponds to the video terminal identifier, and outputting the first video login key comprises:
transmitting, by the mobile terminal, a login authorization request to an application server, and obtaining login authorization information returned by the application server;
transmitting, by the mobile terminal, the login key request carrying the login authorization information and the video terminal identifier to the service server;
storing, by the service server, the login authorization information after receiving the login key request, and generating and returning the first video login key corresponding to the video terminal identifier; and
obtaining, by the mobile terminal, the first video login key, and outputting the first video login key.

5. The method according to claim 4, wherein the obtaining, by the video terminal, an inputted direction control instruction, recognizing a second video login key indicated by the direction control instruction, and performing login on the video terminal according to the second video login key comprises:
obtaining, by the video terminal, the inputted direction control instruction, and recognizing the second video login key indicated by the direction control instruction; and
obtaining, by the video terminal, the login authorization information from the service server based on the video terminal identifier and the second video login key, and performing login on the video terminal according to the login authorization information.

6. The method according to claim 4, wherein the transmitting, by the mobile terminal, a login authorization request to an application server, and obtaining login authorization information returned by the application server comprises:
outputting, by the mobile terminal, an application selection page, and obtaining an authorization application selected from the application selection page; and
transmitting, by the mobile terminal, the login authorization request to the application server corresponding to the selected authorization application, and obtaining the login authorization information returned by the application server.

7. The method according to claim 1, further comprising:
obtaining, by the mobile terminal, an inputted voice matching code from the login page, recognizing matching code content corresponding to the voice matching code, and displaying the matching code content on the login page, wherein there is a correspondence between the first matching code and the voice matching code.

8. The method according to claim 1, wherein the direction control instruction is a voice direction control instruction, and the method further comprises:
obtaining, by the video terminal, the inputted voice direction control instruction, and transmitting the voice direction control instruction to the service server;
recognizing, by the service server, the second video login key indicated by the voice direction control instruction, and transmitting the second video login key to the video terminal; and
performing, by the video terminal, login on the video terminal according to the second video login key.

9. An account login method for a video terminal, comprising:
obtaining a first matching code from a service server based on a video terminal identifier, and outputting the first matching code to enable a mobile terminal to obtain an inputted second matching code from a login page and enable the mobile terminal to obtain the video terminal identifier from the service server based on the second matching code, there being a correspondence between the first matching code and the second matching code; and
obtaining an inputted direction control instruction, recognizing a second video login key indicated by the direction control instruction, and performing login on the video terminal according to the second video login key, the direction control instruction being an instruction inputted according to a first video login key, and there being a correspondence between the first video login key and the second video login key,
the first video login key being an obtained login key that is returned by the service server and corresponds to the video terminal identifier after the mobile terminal transmits a login key request carrying the video terminal identifier to the service server.

10. The method according to claim 9, further comprising:
transmitting a matching code obtaining request carrying the video terminal identifier to the service server, obtaining the first matching code returned by the service server according to the matching code obtaining request, and outputting the first matching code;
obtaining the inputted direction control instruction, and recognizing the second video login key indicated by the direction control instruction; and
obtaining login authorization information from the service server based on the video terminal identifier and the second video login key, and performing login on the video terminal according to the login authorization information.

11. The method according to claim 9, wherein the direction control instruction is a voice direction control instruction, and the method further comprises:
obtaining the inputted voice direction control instruction, and transmitting the voice direction control instruction to the service server to enable the service server to recognize the second video login key indicated by the voice direction control instruction and return the second video login key; and
performing login on the video terminal according to the second video login key.

12. A video terminal, comprising:
a memory storing computer-readable instructions; and
a processor coupled to the memory to execute the computer-readable instructions and configured to perform:
obtaining a first matching code from a service server based on a video terminal identifier, and outputting the first matching code to enable a mobile terminal to obtain an inputted second matching code from a login page and enable the mobile terminal to obtain the video terminal identifier from the service server based on the second matching code, there being a correspondence between the first matching code and the second matching code; and obtaining an inputted direction control instruction, recognizing a second video login key indicated by the direction control instruction, and performing login on the video terminal according to the second video login key, the direction control instruction being an instruction inputted according to a first video login key, and there being a correspondence between the first video login key and the second video login key, the first video login key being an obtained login key that is returned by the service server and corresponds to the video terminal identifier after the mobile terminal transmits a login key request carrying the video terminal identifier to the service server.

13. The video terminal according to claim 12, wherein the processor is further configured to perform:

transmitting a matching code obtaining request carrying the video terminal identifier to the service server, obtaining the first matching code returned by the service server according to the matching code obtaining request, and outputting the first matching code;

obtaining the inputted direction control instruction, and recognizing the second video login key indicated by the direction control instruction; and obtaining login authorization information from the service server based on the video terminal identifier and the second video login key, and performing login on the video terminal according to the login authorization information.

14. The video terminal according to claim 12, wherein the direction control instruction is a voice direction control instruction, and the processor is further configured to perform:

obtaining the inputted voice direction control instruction, and transmitting the voice direction control instruction to the service server to enable the service server to recognize the second video login key indicated by the voice direction control instruction and return the second video login key; and performing login on the video terminal according to the second video login key.

* * * * *